United States Patent
Lee et al.

(10) Patent No.: US 11,343,849 B2
(45) Date of Patent: May 24, 2022

(54) METHOD AND APPARATUS FOR TRANSMITTING CONTENTION-BASED DATA IN WIRELESS COMMUNICATION SYSTEM TO WHICH NON-ORTHOGONAL MULTIPLE ACCESS SCHEME IS APPLIED

(71) Applicant: LG Electronics Inc., Seoul (KR)

(72) Inventors: Hojae Lee, Seoul (KR); Sangrim Lee, Seoul (KR); Dongkyu Kim, Seoul (KR); Kwangseok Noh, Seoul (KR); Myeongjin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 488 days.

(21) Appl. No.: 16/334,619

(22) PCT Filed: Jul. 27, 2017

(86) PCT No.: PCT/KR2017/008130
§ 371 (c)(1),
(2) Date: Mar. 19, 2019

(87) PCT Pub. No.: WO2018/074713
PCT Pub. Date: Apr. 26, 2018

(65) Prior Publication Data
US 2021/0289546 A1 Sep. 16, 2021

Related U.S. Application Data

(60) Provisional application No. 62/410,875, filed on Oct. 21, 2016.

(51) Int. Cl.
*H04W 74/08* (2009.01)
*H04L 5/00* (2006.01)
*H04B 7/216* (2006.01)

(52) U.S. Cl.
CPC ........... *H04W 74/08* (2013.01); *H04L 5/0053* (2013.01)

(58) Field of Classification Search
CPC .... H04W 72/08; H04L 5/0053; H04L 5/0082; H04L 5/0058
See application file for complete search history.

(56) References Cited

U.S. PATENT DOCUMENTS

2004/0048568 A1* 3/2004 Soliman ................. H04B 17/21
455/13.1
2008/0232329 A1 9/2008 Jen
(Continued)

FOREIGN PATENT DOCUMENTS

| KR | 1020150015386 | 2/2015 |
| KR | 101657740 | 9/2016 |
| WO | WO2013139042 | 9/2013 |

OTHER PUBLICATIONS

"3rd Generation Partnership Project; Technical Specification Group Radio Access Network; Evolved Universal Terrestrial Radio Access (E-UTRA); Physical channels and modulation (Release 13)," 3GPP TS 36.211 V13.0.0 (Dec. 2015), 141 pages.

Primary Examiner — Faruk Hamza
Assistant Examiner — Abusayeed M Haque
(74) Attorney, Agent, or Firm — Fish & Richardson P.C.

(57) ABSTRACT

Provided are a method and a device for performing communication using a non-orthogonal code multiple access scheme in a wireless communication system. A terminal divides a terminal identifier into a first field, a second field, a third field and a fourth field and selects a first reference signal based on the first field and a maximum number of reference signals, a second reference signal based on the second field and the maximum number of reference signals, a third reference signal based on the third field and the maximum number of reference signals, and a fourth refer- (Continued)

ence signal based on the fourth field and the maximum number of reference signals. Based on the first reference signal, the second reference signal, the third reference signal or the fourth reference signal, the terminal transmits contention-based data to a base station.

18 Claims, 25 Drawing Sheets

(56) References Cited

U.S. PATENT DOCUMENTS

| | | | |
|---|---|---|---|
| 2014/0341180 A1 | 11/2014 | Liu et al. | |
| 2015/0304857 A1* | 10/2015 | Hong | H04W 60/04 |
| | | | 370/254 |
| 2016/0029239 A1* | 1/2016 | Sadeghi | H04W 24/10 |
| | | | 370/252 |
| 2017/0019882 A1* | 1/2017 | Nimbalker | H04W 72/042 |
| 2018/0152950 A1* | 5/2018 | Xiong | H04W 74/004 |
| 2019/0245664 A1* | 8/2019 | Kim | H04L 5/00 |

* cited by examiner

METHOD AND APPARATUS FOR TRANSMITTING CONTENTION-BASED DATA IN WIRELESS COMMUNICATION SYSTEM TO WHICH NON-ORTHOGONAL MULTIPLE ACCESS SCHEME IS APPLIED

CROSS-REFERENCE TO RELATED APPLICATIONS

This application is a National Stage application under 35 U.S.C. § 371 of International Application No. PCT/KR2017/008130, filed on Jul. 27, 2017, which claims the benefit of U.S. Provisional Application No. 62/410,875, filed on Oct. 21, 2016. The disclosures of the prior applications are incorporated by reference in their entirety.

BACKGROUND OF THE INVENTION

Field of the Invention

The present specification relates to wireless communication, and more particularly, to a method of transmitting contention-based data in a wireless communication system to which a non-orthogonal multiple access scheme is applied, and an apparatus using the method.

Related Art

A wireless communication system is widely deployed to provide various types of communication services, such as voice and data. An object of a wireless communication system is to enable a plurality of UEs to perform reliable communication regardless of their locations and mobility.

In general, a wireless communication system is a multiple access system capable of supporting communication with a plurality of UEs by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A requirement of a next-generation wireless communication system is to accommodate significantly explosive data traffic, to increase a dramatic increase in a transfer rate per user, to accommodate the significantly increased number of connected devices, and to support a very low end-to-end (E2E) latency and high energy efficiency. For this, there is ongoing research on various techniques such as dual connectivity, massive multiple input multiple output (MIMO), in-band full duplex, non-orthogonal multiple access (NOMA), super wideband support, device networking, or the like.

SUMMARY OF THE INVENTION

The present specification provides a method and apparatus for transmitting contention-based data in a wireless communication system to which a non-orthogonal multiple access scheme is applied.

The present specification provides a method and apparatus for transmitting contention-based data in a wireless communication system to which a non-orthogonal multiple access scheme is applied.

The apparatus includes a radio frequency (RF) unit transmitting and receiving a radio signal and a processor operatively coupled to the RF unit.

First, terminologies will be summarized. A user equipment (UE) identifier (ID) may correspond to C-RNTI information. A reference signal may corresponding to a DMRS.

In contention based data transmission to which the legacy NoMA scheme is applied, a DMRS and a codeword are mapped for each index, and thus there is a problem in that collision occurs also in the codeword when collision occurs in the DMRS. In addition, since a UE selects the DMRS based on the C-RNTI, there is also a problem in that collision occurs repeatedly by using the same DMRS when values obtained through a module operation with the C-RNTI are identical. In contention based data transmission to which the NoMA scheme is applied, channels can be distinguished from each other by differently using the DMRS even if multiple UEs use the same time-frequency resource. In order to avoid the aforementioned problem, the present embodiment describes a DMRS selection scheme (or UE ID information configuration method) for avoiding data collision and for decreasing an information amount of a C-RNTI field.

The UE selects a first reference signal, a second reference signal, a third reference signal, and a fourth reference signal, by dividing the UE ID into a first field, a second field, a third field, and a fourth field. In the legacy LTE, although the UE ID consists of 16 bits and thus $2^{16}$ UE IDs exist, a physical resource may be insufficient to generate $2^{16}$ DMRSs. Accordingly, a DMRS may be selected by dividing the UE ID by 4 bits as in the above scheme.

The first reference signal is selected based on the first field and the maximum number of reference signals. The second reference signal is selected based on the second field and the maximum number of reference signals. The third reference signal is selected based on the third field and the maximum number of reference signals. The fourth reference signal is selected based on the fourth field and the maximum number of reference signals.

Specifically, the first reference signal may be selected through a modulo operation value of the first field and the maximum number of reference signals. The second reference signal may be selected through a modulo operation value of the second field and the maximum number of reference signals. The third reference signal may be selected through a modulo operation value of the third field and the maximum number of reference signals. The fourth reference signal may be selected through a modulo operation value of the fourth field and the maximum number of reference signals.

In this case, the first field, the second field, the third field, and the fourth field may be converted into decimal and subjected to a module operation with the maximum number of reference signals. If the maximum number of reference signals is not $2^n$, a reference signal may be selected through a modulo operation as described above by dividing the UE ID with respect to the maximum number of reference signals. For example, if the maximum number of reference signals is 12, the UE may select the first reference signal, the second reference signal, the third reference signal, the fourth reference signal, and the fifth reference signal by dividing the UE ID into the first field, the second field, the third field, the fourth field, and the fifth field. In this case, the first field, the second field, the third field, the fourth field, and the fifth field may be converted into 12 hexadecimal and subjected to a modulation operation with the maximum number of reference signals.

For example, the first field may include first 4 bits of the UE ID. The second field may include second 4 bits of the UE ID. The third field may include third 4 bits of the UE ID. The fourth field may include fourth 4 bits of the UE ID.

For another example, the first field may include first 4 bits of the UE ID. The second field may include first 8 bits of the UE ID. The third field may include first 12 bits of the UE ID. The fourth field may include all 16 bits of the UE ID.

The UE transmits the contention-based data to an eNB based on the first reference signal, the second reference signal, the third reference signal, and the fourth reference signal.

Until the contention based data does not collide with data of another UE, the contention based data may be transmitted by sequentially using the first reference signal, the second reference signal, the third reference signal, and the fourth reference signal.

Specifically, the UE may select the first reference signal and firstly transmit the contention based data. Even if collision occurs in the $1^{st}$ transmission, the UE may select the second reference signal and secondly transmit the contention based data. Even if collision occurs in the $2^{nd}$ transmission, the UE may select the third reference signal and thirdly transmit the contention based data. Even if collision occurs in the $3^{rd}$ transmission, the UE may select the fourth reference signal and fourthly transmit the contention based data. That is, a collision ratio is decreased through $1^{st}$, $2^{nd}$, $3^{rd}$, and $4^{th}$ transmissions, and UE-specific contention based data can be transmitted in the $4^{th}$ transmission.

In addition, the contention based data may be transmitted through the same time-frequency resource by using a codeword mapped to each of the first reference signal, the second reference signal, the third reference signal, and the fourth reference signal. An index may be mapped to each of the reference signal and the codeword. In addition, an index may also be mapped to each of a reference signal and codeword in a scrambling sequence.

In addition, the UE may transmit to the eNB the first reference signal, second reference signal, third reference signal, and fourth reference signal used when the contention based data is transmitted. The eNB may estimate and equalize a channel through which the contention based data is delivered by using a reference signal received from the UE.

Data collision with another UE can be avoided according to the above embodiment. Hereinafter, a method of decreasing an information amount of a UE ID will be described.

The first field may consist of a field indicating detection of the first to fourth reference signals. The second to fourth fields may consist of a field indicating UE ID information reduced due to detection of the first to fourth reference signals through the first field. That is, the UE ID may be derived by combining each index of the reference signal and reduced UE ID information in a data zone. Likewise, the UE may select the reference signal through a module operation of the maximum number of reference signals with each field of the UE ID.

Accordingly, through blind detection for a reference signal, an eNB may derive 4-bit information of the first field and derive 12-bit information through the second to fourth fields in a data zone to acquire a reconfigured UE ID corresponding to 16 bits in total. Accordingly, an information amount of the UE ID may be decreased by 4 bits to improve spectral efficiency.

In addition, the eNB may perform auto-correlation on each reference signal through blind detection, and upon discovering a reference signal exceeding a threshold, may perform channel equalization on a channel through the reference signal, thereby decreasing interference from another channel to the maximum extent possible. That is, there is a change in a method of configuring UE ID information in terms of the UE, and there is a change in a method of detecting UE ID information in terms of the eNB.

In addition, the contention based data may include the UE ID and a transmission field. The transmission field may indicate at which order the contention based data is transmitted to the eNB. The transmission field may consist of 2 bits.

Specifically, if the transmission field indicates that the contention based data is firstly transmitted to the eNB, the contention based data may be transmitted by using the first reference signal. If the transmission field indicates that the contention based data is secondly transmitted to the eNB, the contention based data may be transmitted by using the second reference signal. If the transmission field indicates that the contention based data is thirdly transmitted to the eNB, the contention based data may be transmitted by using the third reference signal. If the transmission field indicates that the contention based data is fourthly transmitted to the eNB, the contention based data may be transmitted by using the fourth reference signal.

According to the proposed scheme, a collision problem of a codeword can be solved when a reference signal collides due to a mapping scheme of the reference signal and the codeword in contention-based data transmission. That is, since a DMRS is selected by dividing a C-RNTI, a collision ratio may be decreased through four transmission attempts until no collision occurs, and UE-specific transmission may be achieved in $4^{th}$ transmission.

In addition, according to the proposed scheme, the entire C-RNTI may be reconfigured using a field for DMRS detection and a reduced C-RNTI information field in a data zone, thereby decreasing an information amount for UE ID transmission.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
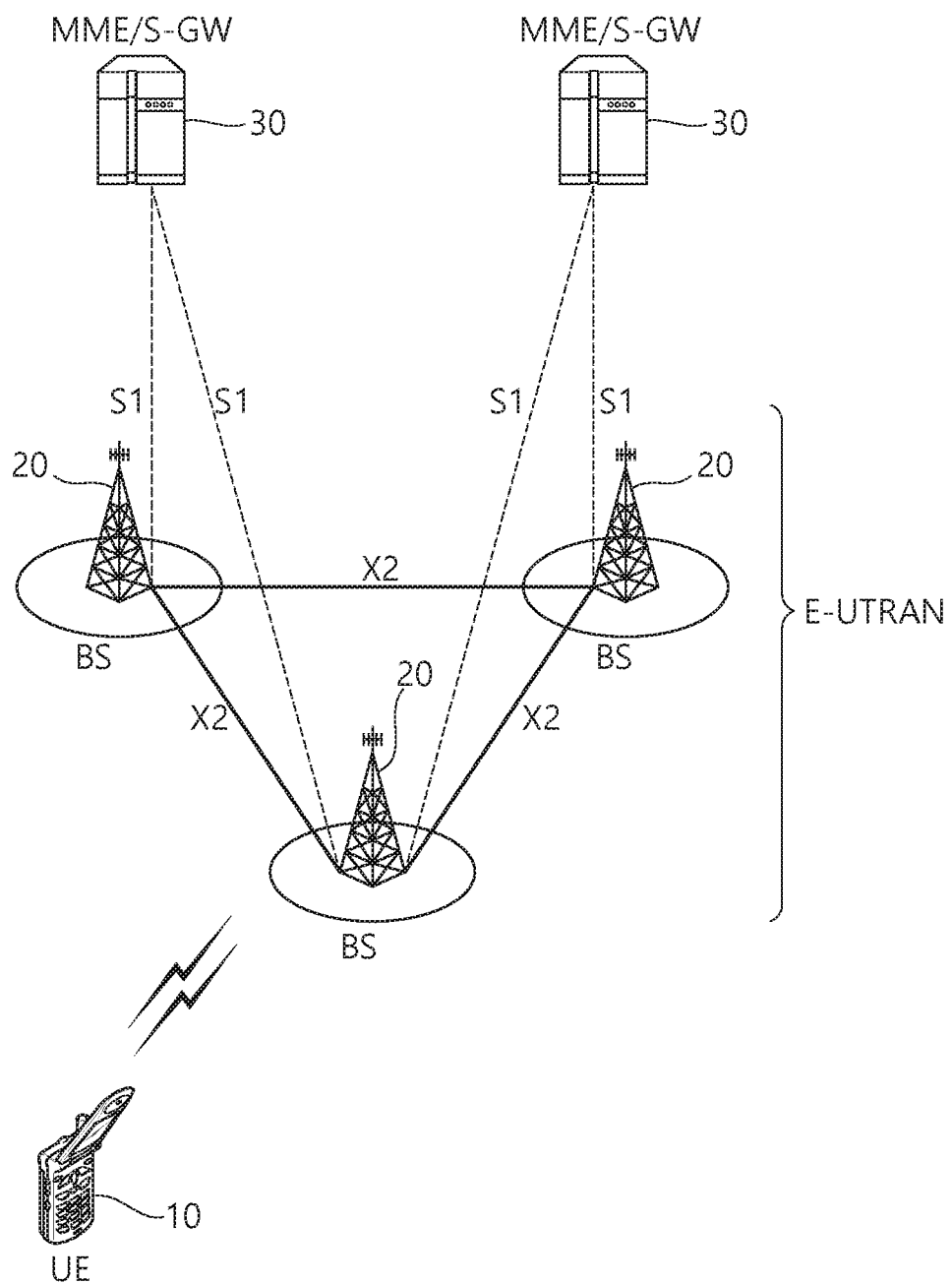
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
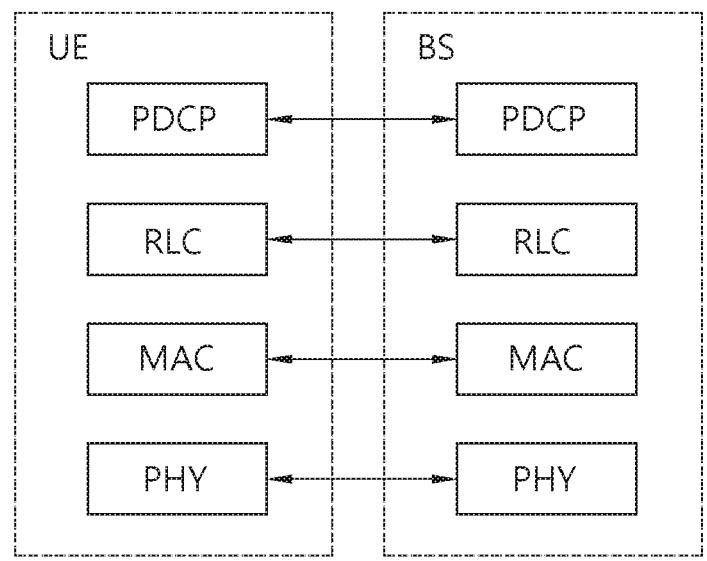
FIG. 2 is a diagram illustrating a radio protocol architecture for a user plane.
Figure 3:
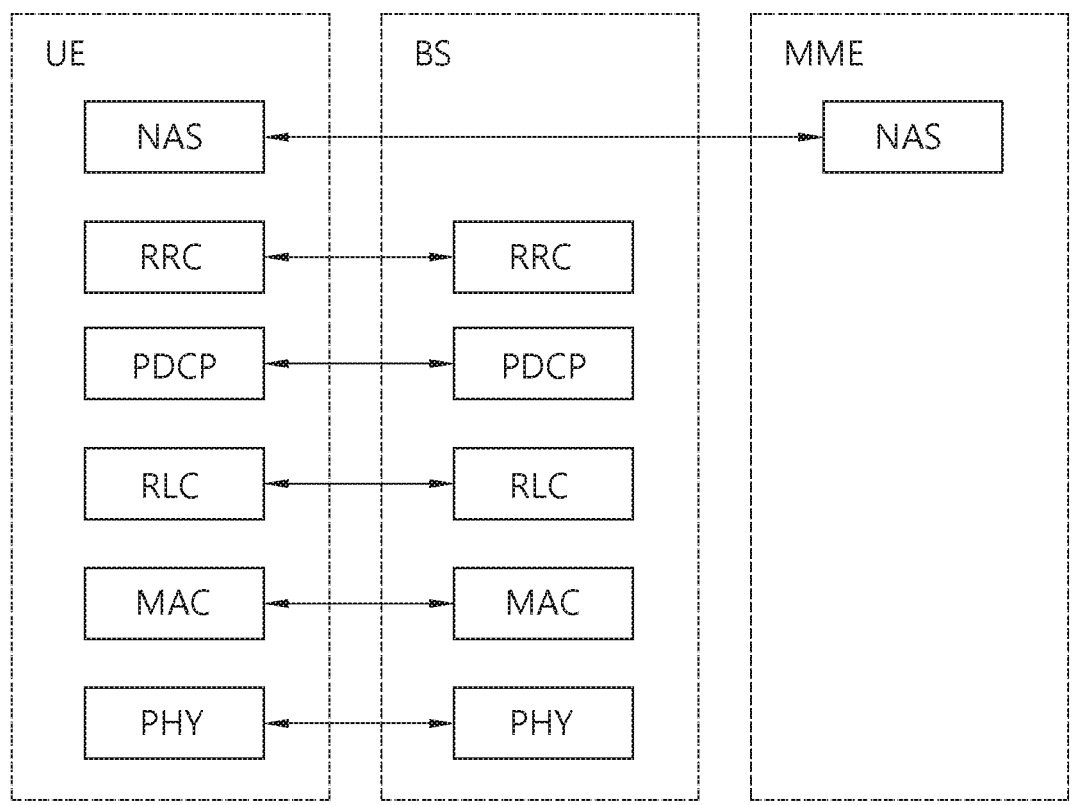
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
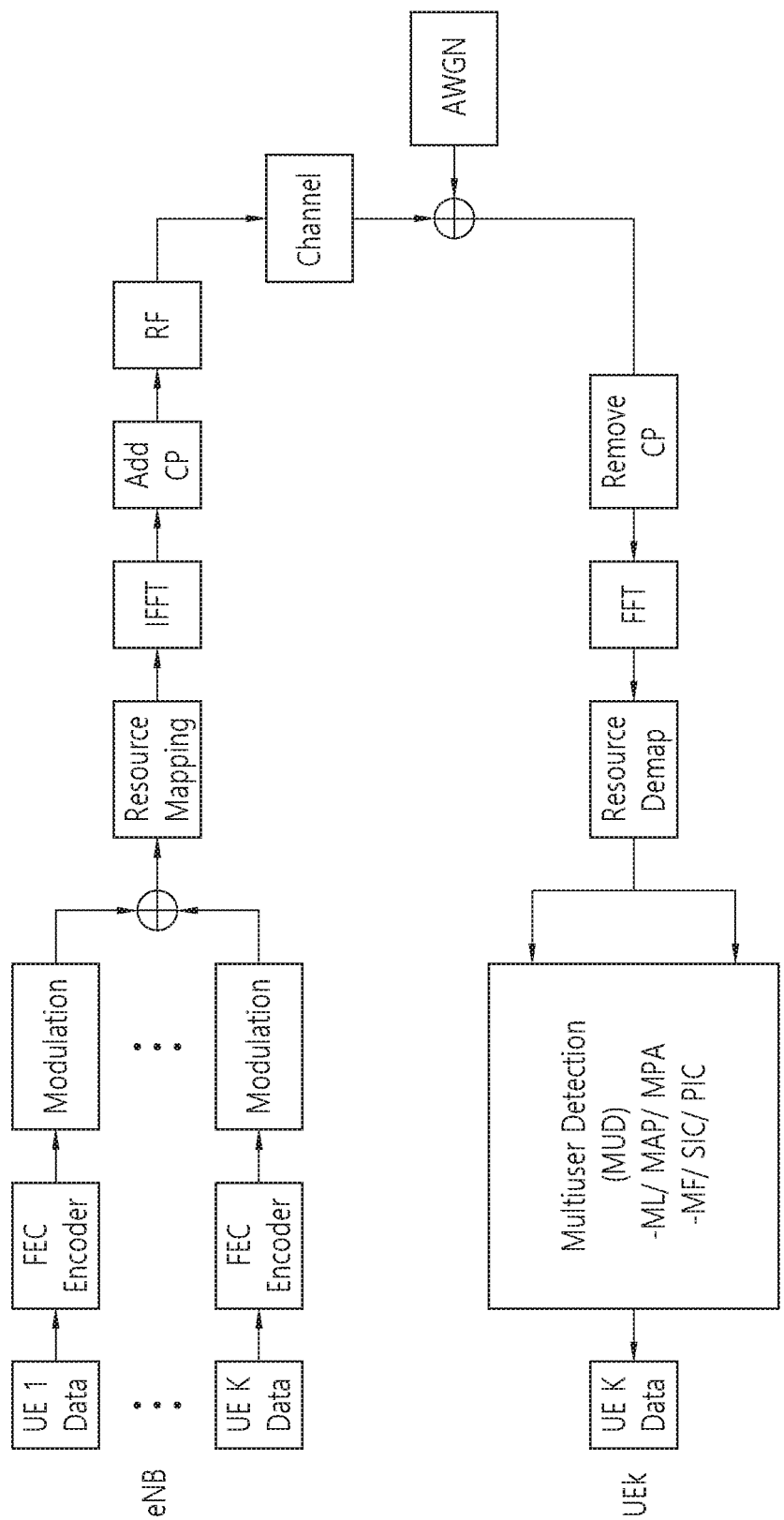
FIG. 4 is a block diagram illustrating NOMA based downlink transmission/reception (Tx/Rx) of a communication apparatus.

FIG. 4 is a block diagram illustrating NOMA based downlink transmission/reception (Tx/Rx) of a communication apparatus.

In a Non-orthogonal Coded Multiple Access (NCMA) scheme for transmitting multi-UE (or multi-user) information by allocating the multi-UE information to the same resource, a transmitter and receiver structure for downlink support as shown in FIG. 4 is general. The NOMA system may be referred to as Multiuser Superposition Transmission (MUST) in the 3GPP standardization task. The NOMA system is considered as the element technology of the next generation 5G system intended to obtain transmission capacity gain or increase the number of simultaneous accesses as compared with the LTE system by transmitting information for a plurality of UEs to the same time-frequency resource through superposition. Examples of the NOMA based technology of the next generation 5G system include MUST for identifying UEs based on a power level, Sparse Code Multiple Access (SCMA) that uses sparse complex codebook based modulation, and interleave division multiple access (IDMA) that uses a user-specific interleaver.

In case of the MUST system, the transmitter of FIG. 4 varies power allocation of each symbol after modulation of multi-UE data or transmits the multi-UE data by hierarchically modulating the multi-UE data based on hierarchical modulation, and the receiver demodulates the data of the multi-UE (hereinafter, referred to as multi-UE data) through multi-UE detection (or multiuser detection) (MUD).

In case of the SCMA system, the transmitter of FIG. 4 replaces a modulation procedure of a forward error correction (FEC) encoder and modulation procedure for multi-UE data with a sparse complex codebook modulation scheme which is previously scheduled, and the receiver demodulates the multi-UE data through MUD.

In case of the IDMA system, the transmitter of FIG. 4 modulates FEC encoding information for multi-UE data through a UE-specific interleaver, and the receiver demodulates the multi-UE data through MUD.

Each system may demodulate the multi-UE data in various MUD schemes. Examples of the various MUD schemes include Maximum Likelihood (ML), Maximum joint A posteriori Probability (MAP), Message Passing Algorithm (MPA), Matched Filtering (Mf), Successive Interference Cancellation (SIC), Parallel Interference Cancellation (PIC), and Codeword Interference Cancellation (CWIC). There may be a difference in demodulation complexity and processing time delay in accordance with each demodulation scheme or each demodulation attempt.

Figure 5:
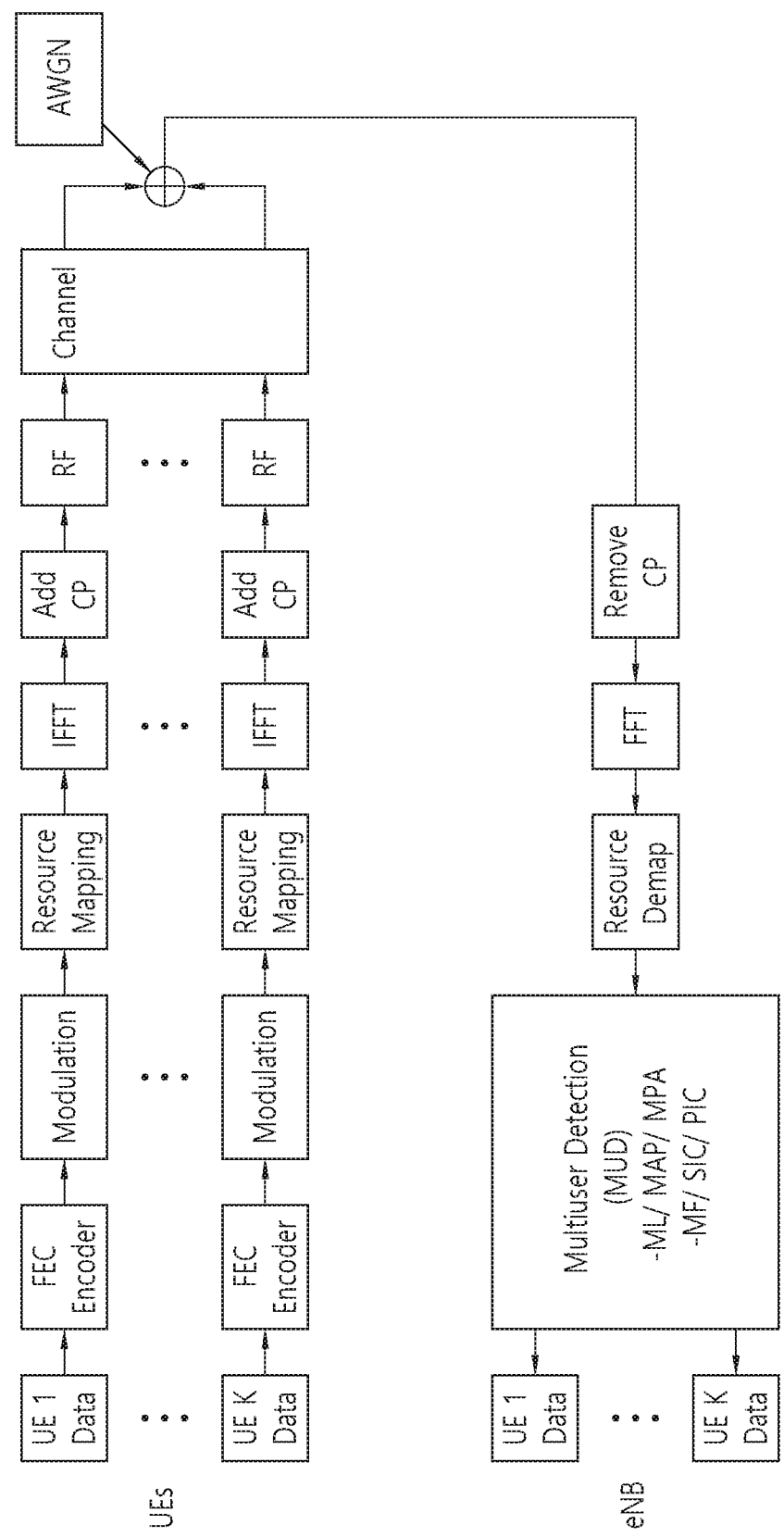
FIG. 5 is a block diagram illustrating NOMA based uplink transmission/reception (Tx/Rx) of a communication apparatus.

FIG. 5 is a block diagram illustrating NOMA based uplink transmission/reception (Tx/Rx) of a communication apparatus.

A transmitter and receiver structure for uplink support of the NOMA based system that transmits information of multi-UE (hereinafter, referred to as multi-UE information) by allocating the multi-UE information to the same resource is shown in FIG. 5. Each system may transmit multi-UE data in the same manner as the description of the downlink structure of FIG. 4 and modulate the multi-UE data through the receiver. Since the NOMA based systems transmit multi-UE signals to the same time-frequency resource through superposition, the systems have a higher decoding error rate as compared with the LTE system but may support higher frequency usage efficiency or more massive connectivity. The NOMA systems may achieve higher frequency usage efficiency or more massive connectivity while maintaining a decoding error through coding rate control in accordance with a system environment.

Since the NOMA based systems allocate data of multi-UEs to the same resource, interference of multi-UE data is necessarily generated as compared with allocation of single-UE data. A signal of the kth receiver in the NOMA based system of FIG. 4 is simply expressed as illustrated in the following Equation 1.

$$y_k = \sum_{n=1}^{K} h_k s_n + n_k = h_k s_k + \sum_{n \neq k, n=1}^{K} h_k s_n + n_k \quad \text{[Equation 1]}$$

In this case, $h_k$ means a channel from the transmitter to the kth receiver, $s_k$ means a data symbol to the kth receiver, and $n_k$ means signal noise. K is the number of multiple UEs allocated to the same time-frequency resource.

The second term $$\sum_{n\neq k, n=1}^{K} h_k s_n$$

of the third formula of the Equation 1 indicates multiuser interference (MUI) signal according to a data symbol to another receiver. Therefore, transmission capacity according to the received signal is simply expressed as illustrated in the following Equation 2.

$$C = \sum_{k=1}^{K} R_k \quad \text{[Equation 2]}$$

$$R_k = \log_2\left(1 + \frac{|h_k s_k|^2}{|\sum_{n\neq k, n=1}^{K} h_k s_n|^2 + \sigma_k}\right) = \log_2\left(1 + \frac{\text{Channel Gain}}{MUI + \text{Noise}}\right), \forall k$$

In transmission capacity of the above Equation 2, the number of Rk added in accordance with increase of K may be increased, whereby increase of C may be expected. However, each Rk may be reduced due to increase of MUI in accordance with increase of K, entire transmission capacity C may be reduced. In accordance with the MUD scheme, even though data of each UE may be demodulated while MUI is being effectively reduced, the presence of MUI reduces entire transmission capacity and requires MUD of high complexity. If MUI occurrence of data transmission of the multi-UE is minimized, higher transmission capacity may be expected. Alternatively, if MUI occurrence for data transmission of the multi-UE may be controlled quantitatively, higher transmission capacity may be planned by scheduling of data superposition of the multi-UE. Therefore, the development of multi-UE access technology that may control MUI according to data superposition transmission of the multi-UE is required. The development of multi-UE access technology that may control MUI generated during data superposition transmission of the multi-UE to the same time-frequency resource is required.

Therefore, the present invention suggests a non-orthogonal coded multiple access (NCMA) that minimizes multi-UE interference of the next generation 5G system.

Figure 6:
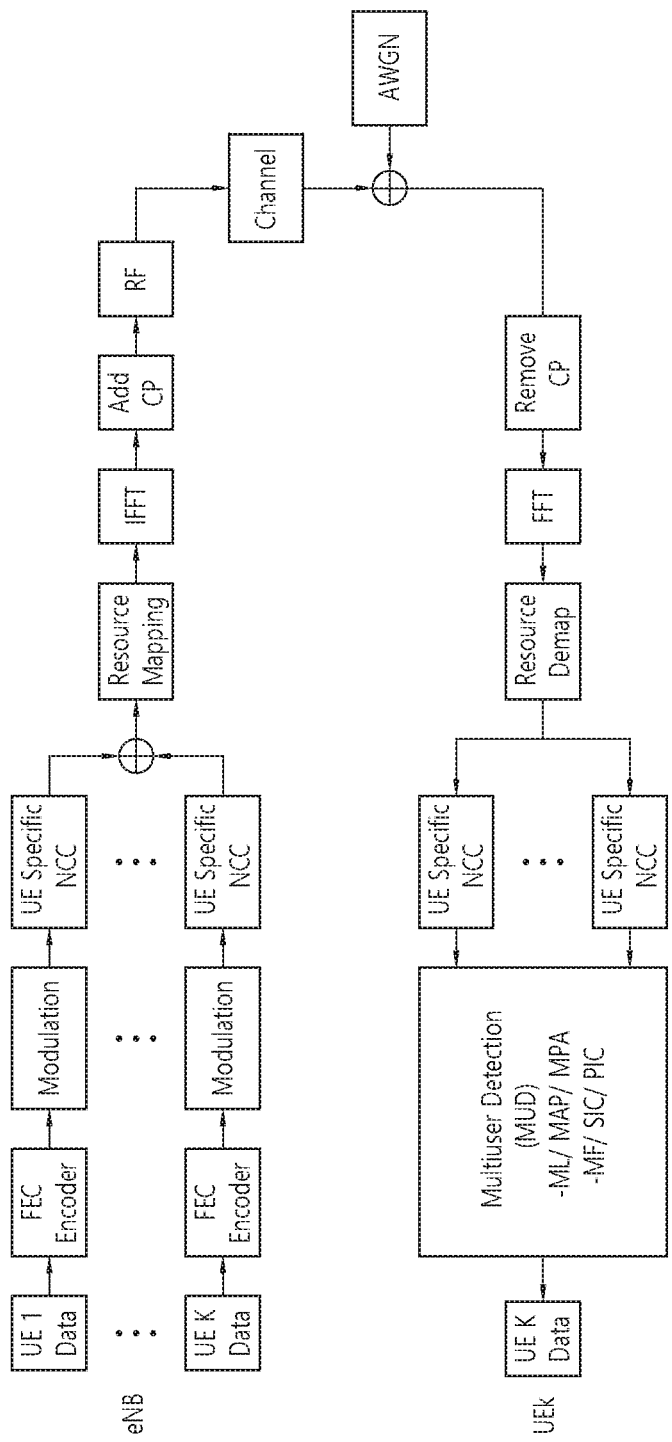
FIG. 6 is a block diagram illustrating NCMA based downlink transmission/reception (Tx/Rx) of a communication apparatus.
Figure 7:
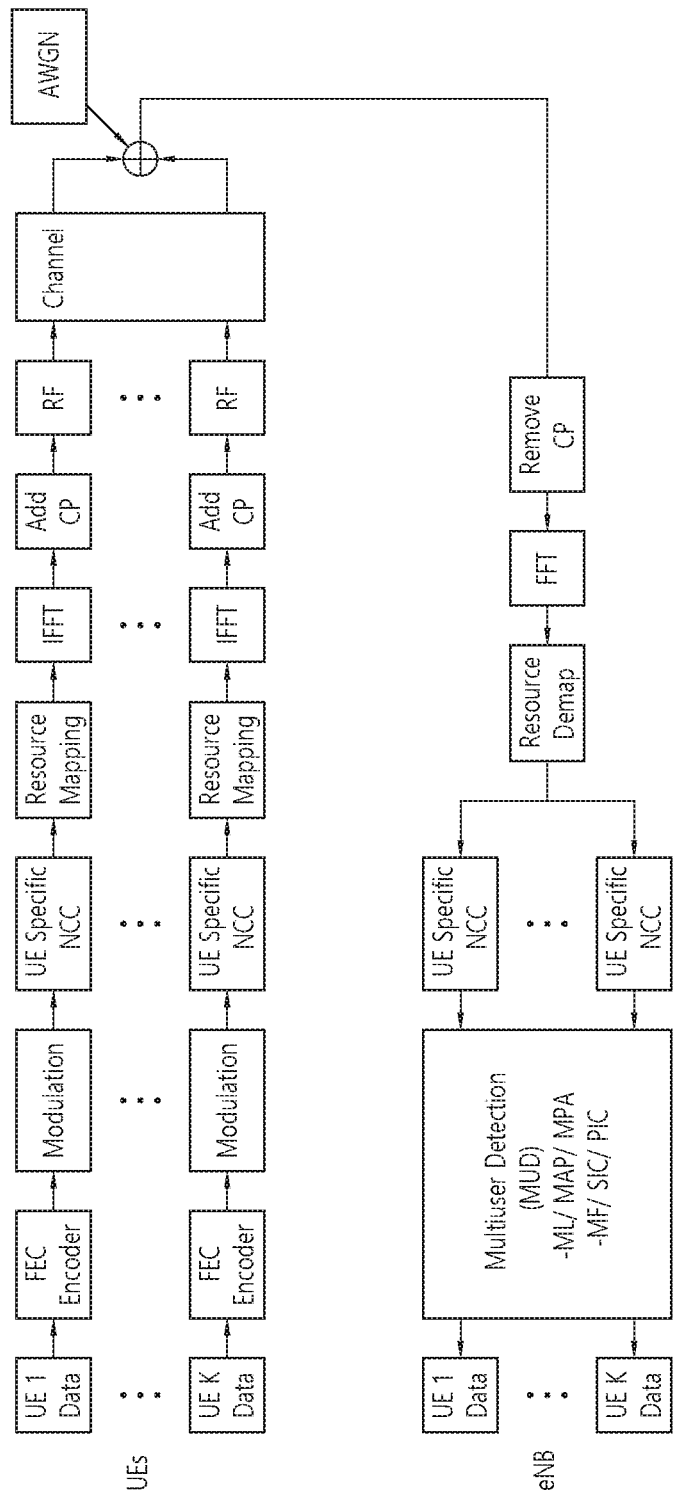
FIG. 7 is a block diagram illustrating NCMA based uplink transmission/reception (Tx/Rx) of a communication apparatus.

FIG. 6 is a block diagram illustrating NCMA based downlink transmission/reception (Tx/Rx) of a communication apparatus, and FIG. 7 is a block diagram illustrating NCMA based uplink transmission/reception (Tx/Rx) of a communication apparatus.

The present invention suggests an NCMA scheme that minimizes multi-UE interference when data of multi-UE are transmitted to the same time-frequency resource through superposition. FIGS. 6 and 7 illustrate downlink and uplink transmitter and receiver structures of the NCMA system that performs superposition transmission by using UE specific non-orthogonal code cover (NCC) when multi-UE information is allocated to the same time-frequency resource. The transmitter/receiver (or transmitting side/receiving side) allocates UE-specific NCC to each UE by using a non-orthogonal codebook which is previously defined.

The codeword mentioned in the present invention means a complex element vector selected by (or allocated to) each UE to perform non-orthogonal multiple access. The codebook means a set of codewords used by each UE to perform non-orthogonal multiple access. The codebook mentioned as above may exist as a plurality of codebooks. The UE-specific NCC means that the complex element vector of the codebook selected by (or allocated to) each UE is used for a symbol to be transmitted. Therefore, the NCC (or UE-specific NCC) may be expressed as codebook index and codeword index. The non-orthogonal codebook is expressed as illustrated in the following Equation 3.

$$C = [c^{(1)} \ \ldots \ c^{(K)}] = \begin{bmatrix} c_1^{(1)} & \ldots & c_1^{(K)} \\ \vdots & \ddots & \vdots \\ c_N^{(1)} & \ldots & c_N^{(K)} \end{bmatrix} \quad \text{[Equation 3]}$$

In the above Equation 3, $c^{(j)}$ is a codeword for the jth UE, and a codeword set for a total of K UEs becomes a codebook C. Use of $c^{(j)}$ for data transmission of the jth UE is defined as NCC. Also, the codebook may be expressed as a vector length N of the codeword and the number K of codewords. In this case, N means a spreading factor, and K means a superposition factor. For convenience of description, although one codeword is used for one UE, a plurality of codewords may be used by one UE or one codeword may be used by a plurality of UEs. Also, one or more codewords allocated to one UE may be subjected to hopping of codewords by use of different codewords in the same codebook or use of different codewords in different codebooks in accordance with time or usage frequency.

UE-specific NCC may be allocated by connection with UE ID in RRC connection process, or may be allocated through DCI (downlink control information) format included in a downlink control channel (for example, PDCCH).

In case of an uplink environment used for contention based multiple access (MA), a UE may select non-orthogonal codewords randomly or through connection with UE ID. At this time, UE-specific NCC is not allocated by a base station but directly selected by a UE, whereby NCC contention between multiple UEs may occur. A success rate for identification of multi-UE information is reduced due to MUD if there is contention of NCC in the base station which is a receiver.

The UE-specific NCC may be defined by Grassmannian line packing, and a chordal distance formed by two random vectors in the same subspace is always maintained equally. That is, the chordal distance may be obtained mathematically or algorithmically as a codebook that satisfies $\min_C (\max_{1 \leq k < j \leq k} \sqrt{1 - |c^{(k)*} \cdot c^{(j)}|^2})$, $C \subset \mathbb{C}^{N \times K}$. The UE-specific NCC has features as expressed by the following Equation 4.

$$\begin{cases} |c^{(k)*} \cdot c^{(k)}| = 1, \forall k, k = 1, \ldots, K, \\ \quad \text{if } N > K, |c^{(k)*} \cdot c^{(j)}| = \delta, \\ \forall k, \forall j, k = 1, \ldots, K, j = 1, \ldots, K, \\ \quad \text{if } N \leq K, |c^{(k)*} \cdot c^{(j)}| = 0, \\ \forall k, \forall j, k = 1, \ldots, K, j = 1, \ldots, K. \end{cases} \quad \text{[Equation 4]}$$

In this case, $c^{(k)*}$ is a conjugate codeword of c(k). The features of the Equation 4 are as listed in the followings (1), (2), and (3).

(1) Multiplication of the same codewords in the transmitter and the receiver is 1.

(2) The chordal distance between a codeword and another codeword in the same codebook is equally maintained.

(3) If N≤K, a codeword is orthogonal to another codeword.

The codebook having the above features is previously scheduled by the transmitter/receiver (or transmitting side/receiving side) to configure UE-specific NCC. In this case, a lower bound of a chordal distance $$\delta_{N,k} \geq \sqrt{1 - \frac{(N-1)K}{N(K-1)}}$$

according to two random codewords is obtained. Therefore, MUI for superposition transmission of multi-UE data is determined by being minimized by the lower bound. Also, since the chordal distance for the two random codewords is always maintained equally, statistical prediction of MUI may be performed by the number of UEs. If the number of UEs is determined, since a decoding error rate of the receiver may be predicted by MUI value, MCS level may be controlled based on interference for multi-UE superimposition transmission. For example, when K codewords are transmitted in (N×1) dimension, if the receiver performs decoding using its codewords, 1 is decoded from its codeword, and statistical interference of $\delta_{N,K}(K-1)$ remains from another K−1 codewords. This value is varied depending on an optimization level of a codebook design. Also, since a difference in a value of $\delta_{N,K}$ exists depending on the optimization level of the codebook design, the number K of superposition UEs or the number N of used resources may be varied depending on Required SINR or target QoS of the communication system, whereby the MUI value may be controlled.

The embodiment of the non-orthogonal codebook is expressed in the form of 3GPP TS 36.211 as listed in that following Tables 1 and 2, and may be used as UE-specific NCC.

Table 1 illustrates a codebook in case of Spreading Factor N=2.

TABLE 1

| # of codewords (Max. # of users: K) | Examples of spreading codebook [$c^{(1)}$ ... $c^{(K)}$] |
|---|---|
| 2 | $\begin{bmatrix} 1 & 1 \\ 1 & -1 \end{bmatrix}$ |
| 3 | $\begin{bmatrix} -0.5078-0.2451i & -0.8055+0.5684i & -0.1483-0.4194i \\ 0.5640-0.6034i & 0.1640+0.0357i & -0.8751-0.1904i \end{bmatrix}$ |
| 4 | $\begin{bmatrix} -0.4907-0.7256i & -0.6440-0.5906i & -0.1657+0.2160i & -0.5775-0.2480i \\ 0.4510+0.1709i & -0.4452+0.1956i & 0.9349-0.2279i & -0.3586-0.6902i \end{bmatrix}$ |

Table 2 illustrates a codebook in case of Spreading Factor N=4.

TABLE 2

| # of codewords (Max. # of users: K) | Examples of spreading codebook [$c^{(1)}$ ... $c^{(K)}$] |
|---|---|
| 4 | $\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 6 | $\begin{bmatrix} -0.0557-0.4476i & -0.1684-0.8131i & -0.0149+0.2205i & \ldots \\ -0.0198-0.1206i & -0.3294-0.3689i & -0.0487+0.4148i \\ 0.4023-0.1460i & -0.4021+0.2118i & -0.6703+0.0282i & \ldots \\ -0.6521-0.4251i & -0.0729-0.0903i & -0.2158-0.3003i \\ -0.1499-0.3961i & 0.0471-0.2647i & 0.3131-0.5204i & \ldots \\ -0.5576-0.0206i & 0.6726-0.0552i & 0.0357+0.0924i \\ 0.5675+0.3346i & -0.0866+0.1557i & -0.0287+0.3624i & \ldots \\ -0.0286+0.2589i & 0.4567-0.2792i & 0.6985+0.4372i \end{bmatrix}$ |

TABLE 2-continued

| # of codewords (Max. # of users: K) | Examples of spreading codebook [$c^{(1)}$ ... $c^{(K)}$] |
|---|---|
| 8 | $\begin{bmatrix} -0.2381-0.8369i & -0.6599-0.1222i & -0.6557-0.1776i & -0.1561+0.0861i & \ldots \\ & -0.1374+0.1275i & -0.1849+0.3859i & -0.2426-0.2248i & -0.1703-0.0604i \\ -0.2593-0.3320i & 0.4906+0.0221i & 0.3934+0.2749i & -0.3453-0.2068i & \ldots \\ & -0.5596+0.0272i & 0.0616+0.0315i & -0.3027-0.3133i & -0.7664+0.1256i \\ -0.1249+0.0320i & 0.0425+0.3856i & 0.0440-0.3295i & -0.3979+0.525i & \ldots \\ & -0.5272-0.2195i & 0.0649-0.8770i & -0.2452+0.4427i & -0.0149-0.4727i \\ -0.2180-0.342i & 0.3968-0.0250i & -0.3444-0.2811i & -0.7817-0.1845i & \ldots \\ & 0.2417+0.5162i & 0.1956-0.0203i & 0.4625-0.4805i & 0.0794-0.3663i \end{bmatrix}$ |

Various values may be obtained using mathematical equation or algorithm in addition to the above Tables 1 and 2.

Figure 8:
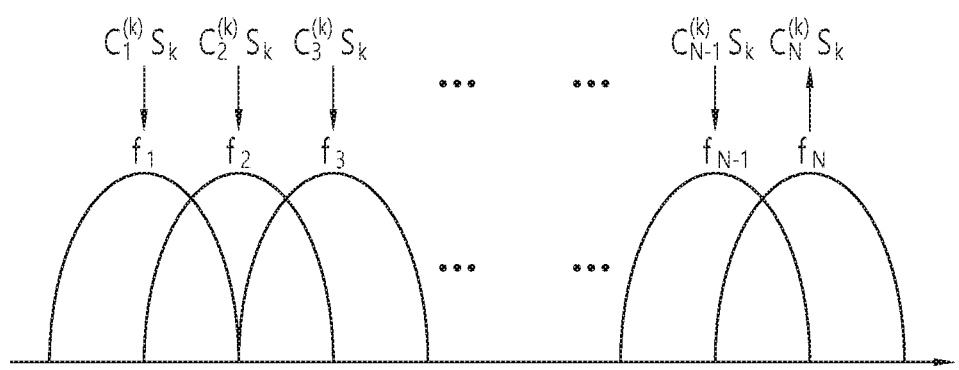
FIG. 8 is a conceptual diagram illustrating a frequency axis of data transmission according to UE-specific NCC.

FIG. 8 is a conceptual diagram illustrating a frequency axis of data transmission according to UE-specific NCC.

FIG. 8 illustrates a concept that a transmitter (or transmitting side) transmits kth UE data on a frequency axis through UE-specific NCC. When UE-specific NCC defined by Grassmaniann line packing is previously scheduled by the transmitter and the receiver, data for the kth UE is multiplied by a codeword corresponding to the kth UE. At this time, one data symbol sk corresponds to a codeword vector $c^{(k)}$ of (N×1) dimension. Then, N elements of the codeword correspond to N subcarriers.

That is, in FIG. 8, since one data symbol is transmitted to N subcarriers, the same time-frequency resource efficiency is reduced to 1/N as compared with the legacy LTE system. On the other hand, if N or more symbols are transmitted by superposition, time-frequency resource efficiency is increased as compared with the LTE system. For example, if K symbols are transmitted by superposition in case of N<K, frequency resource efficiency is increased as much as K/N times.

Figure 9:
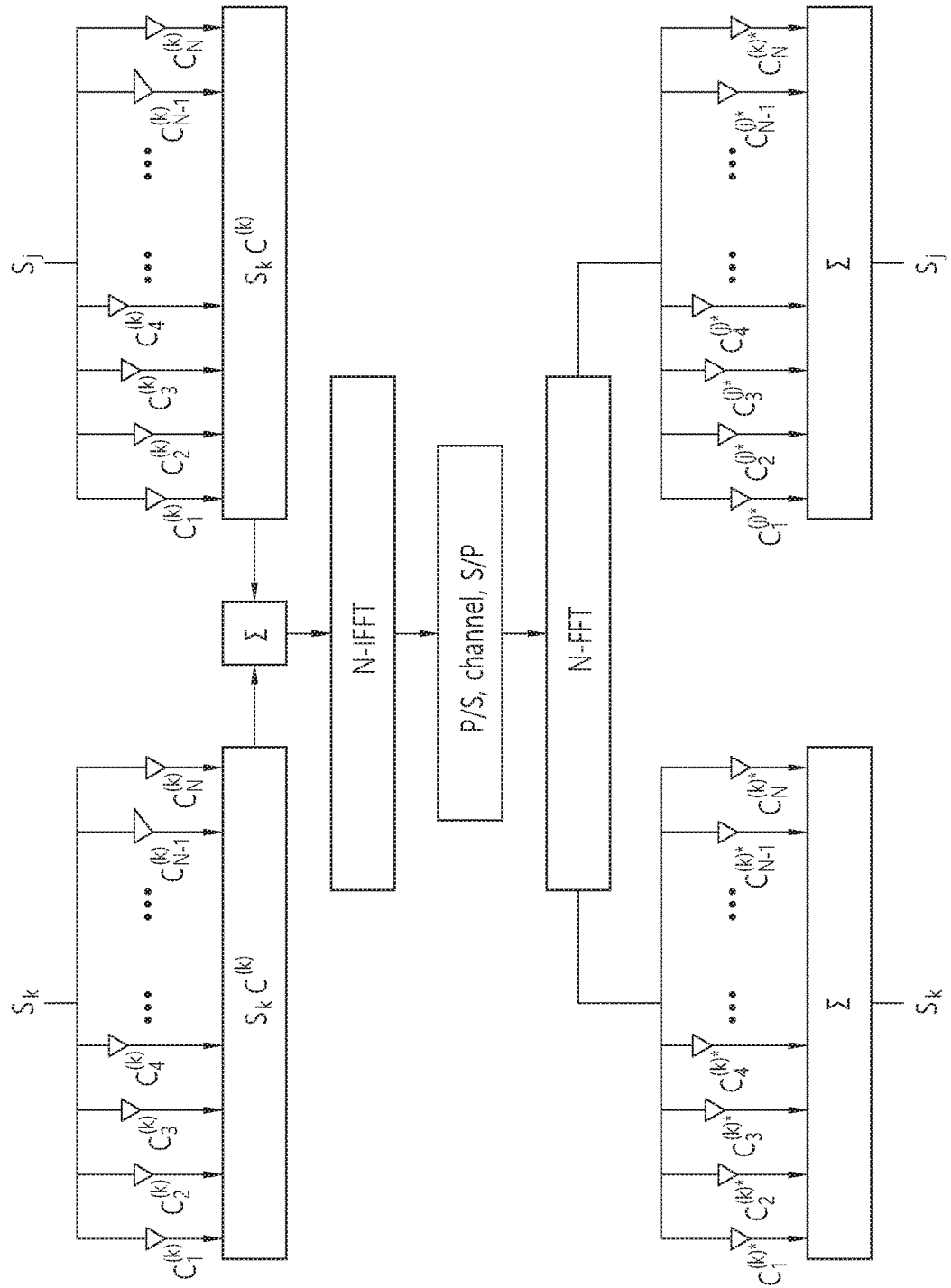
FIG. 9 is a structural diagram illustrating basic transmission and reception of NCMA system.

FIG. 9 is a structural diagram illustrating basic transmission and reception of NCMA system.

FIG. 9 is a basic transmission and reception structural view of NCMA system that uses UE-specific NCC. Data symbols for each UE are converted to UE-specific NCC corresponding to each UE and superposed in the transmitter. A frequency axis signal of a superposed N length is converted to a time-axis signal through N-IFFT, whereby OFDM transmission is performed, and the receiver restores the time-axis signal to a frequency-axis signal through N-FFT. The restored frequency-axis signal decodes each UE data symbol using a conjugate codeword of UE-specific NCC corresponding to each UE. The decoded $s_k$ may include MUI depending on the number of superposed UEs, and exact $s_k$ decoding is available through MUD. At this time, the length of the frequency-axis signal converted in accordance with UE-specific NCC which is previously defined may be shorter than N. For example, if two frequency-axis signal vectors converted to UE-specific NCC of N/2 length are connected in series to form N length, it will be apparent that demodulation is available in the receiver even in case of N-FFT.

In case of downlink, a detection equation for data decoding in the kth UE receiver is expressed as illustrated in the following Equation 5.

$$y_k = \sum_{n=1}^{K} H_k c^{(n)} s_n + n_k, \quad \text{[Equation 5]}$$

-continued $$\hat{y}_k = \left[ \frac{[y_k]_j}{[H_k]_{j,j}} \right]_{j=1,\ldots,N} = \sum_{n=1}^{K} c^{(n)} s_n + \hat{n}_k,$$

In the above Equation 5, $H_k$ means (N×N) channel matrix from the kth transmitter to the receiver, and includes frequency-axis channel coefficients as a diagonal matrix. $c^{(k)}$ is (N×1) UE-specific NCC vector for the receiver at the kth transmitter, $s_k$ is a data symbol to the kth receiver, and n means (N×1) signal noise vector. K is the number of multi-UEs allocated to the same time-frequency resource. In this case, $$\left[ \frac{[A]_j}{[B]_{j,j}} \right]_{j=1,\ldots,N}$$

means division of the jth element of vector A and the jth diagonal element of matrix B. If the vector A is a diagonal matrix, the vector A means element division of diagonal matrixes.

A signal of desired codewords and noise remain through channel compensation in the above Equation 5, and are detected as expressed by the following Equation 6 through conjugate codeword of UE-specific NCC of the receiver.

$$\tilde{y}_k = c^{(k)*} \cdot \hat{y}_k = c^{(k)*} \cdot c^{(k)} s_k + \sum_{n \neq k, n=1}^{K} c^{(k)*} \cdot c^{(n)} s_n + \tilde{n}_k, \quad \text{[Equation 6]}$$

$$= s_k + \sum_{n \neq k, n=1}^{K} c^{(k)*} \cdot c^{(n)} s_n + \tilde{n}_k.$$

In the above Equation 6, the second item of the last column indicates MUI, and may be removed or reduced through the MUD scheme.

In case of uplink, a detection equation for data decoding in the receiver of the base station is expressed as illustrated in the following Equation 7.

$$y = \sum_{n=1}^{K} H_n c^{(n)} s_n + n = H_k c^{(k)} s_k + \sum_{n \neq k, n=1}^{K} H_n c^{(n)} s_n + n, \quad \text{[Equation 7]}$$

The second term of the third formula of the Equation 7 indicates multi-UE interference signal MUI according to a data symbol to another receiver. A detection equation of the receiver for data decoding of the kth UE is expressed as illustrated in the following Equation 8.

$$\hat{y}_k = \quad \text{[Equation 8]}$$

$$\left[\frac{[y]_j}{[H_k]_{j,j}}\right]_{j=1,\ldots,N} = c^{(k)} s_k + \sum_{n=1}^{K} \left[\frac{[H_n]_{j,j}}{[H_k]_{j,j}}\right]_{j=1,\ldots,N} c^{(n)} s_n + \tilde{n},$$

A signal of desired codewords, MUI, and noise remain through channel compensation for the kth UE data, and are detected as expressed by the following Equation 9 through conjugate codeword of UE-specific NCC of the receiver.

$$\tilde{y}_k = c^{(k)*} \cdot \hat{y}_k = c^{(k)*} \cdot c^{(k)} s_k + \sum_{n \neq k, n=1}^{K} c^{(k)*} \cdot \quad \text{[Equation 9]}$$

$$\left[\frac{[H_n]_{j,j}}{[H_k]_{j,j}}\right]_{j=1,\ldots,N} c^{(n)} s_n + \tilde{n},$$

$$= s_k + \sum_{n \neq k, n=1}^{K} c^{(k)*} \cdot \left[\frac{[H_n]_{j,j}}{[H_k]_{j,j}}\right]_{j=1,\ldots,N} c^{(n)} \cdot s_n + \tilde{n}.$$

In the above Equation 9, the second item of the last column indicates MUI, and may be removed or reduced through the MUD scheme. At this time, frequency-axis channel change of $$\left[\frac{[H_n]_{j,j}}{[H_k]_{j,j}}\right]_{j=1,\ldots,N}$$

causes a change of MUI value when MUD according to UE-specific NCC is performed due to a change of a channel environment from the multi-UE. In this case, a UE-specific NCC may be called a UE specific spreading code.

Among the NOMA techniques, a scheme (e.g., SCMA, CDMA, etc.) based on non-orthogonal codebook transmits multiple symbols with superposition through a spreading scheme. According to a degree of superposition between spreading symbols and a configuration of a non-orthogonal codebook, there is a tradeoff relation between interference caused by superposition and a data rate increase caused by superposition. Herein, the interference caused by superposition may be classified into inter-symbol interference (ISI) of a single user and inter-user interference (IUI) between multiple users, and may result in a decrease in a block error rate (BLER). Therefore, superposition scheduling and signaling are required according to a required traffic or degree of interference.

Therefore, the present specification proposes superposition scheduling and signaling according to interference caused by superposition or traffic of a next-generation 5G system.

The present specification proposes an effective operation scheme and signaling according to superposition scheduling or traffic of NOMA schemes which utilize a non-orthogonal codebook.

Hereinafter, an orthogonal subset operation scheme of a non-orthogonal codebook is described.

There is a need to develop an operation scheme for a case where an overall superposition degree of a non-orthogonal codebook is not used according to traffic of a single user or multiple users.

A transmitting side/receiving side allocates a UE specific spreading code to each user by using a predefined non-orthogonal codebook. The UE specific spreading code is expressed by the following equation.

$$C = [c^{(1)} \ \ldots \ c^{(K)}] = \begin{bmatrix} c_1^{(1)} & \ldots & c_1^{(K)} \\ \vdots & \ddots & \vdots \\ c_N^{(1)} & \ldots & c_N^{(K)} \end{bmatrix} \quad \text{[Equation 10]}$$

Herein, N is a spreading factor, and K is a superposition factor and has an overloading factor of K/N.

A UE specific spreading code is defined by a non-orthogonal codebook, and includes an orthogonal subset. In this case, non-orthogonality and orthogonality co-exist in one codebook. In the above case, an information exchange amount may be decreased for a codebook agreement between the transmitting side/receiving side.

That is, the codebook satisfies $C \subset C^{N \times K}$, and an orthogonal subset satisfies $OC \subset C$. Then, the orthogonal subset OC has features expressed as follows.

$$\begin{cases} |c^{(k)*} \cdot c^{(k)}| = 1, \forall k, k = 1, \ldots, O, \\ |c^{(k)*} \cdot c^{(j)}| = 0, \forall k, \forall j, k \neq j, k = 1, \ldots, O, \\ \qquad j = 1, \ldots, O, \end{cases} \quad \text{[Equation 11]}$$

Herein, $C^{(K)*}$ is a conjugate codeword of $C^{(K)}$. A product of the same codeword is 1 in the transmitting side/receiving side. A codeword thereof and another codeword are orthogonal in an orthogonal subset of the same codebook.

In addition, a complementary set of the orthogonal subset satisfies $OC^c \subset C$. Then, the complementary set of the orthogonal subset, i.e., $OC^c$, has features expressed as follows.

$$\begin{cases} |c^{(k)*} \cdot c^{(k)}| = 1, \forall k, k = 1, \ldots, K - O, \\ |c^{(k)*} \cdot c^{(j)}| = \delta_{kj}, \forall k, \forall j, k \neq j, k = 1, \ldots, K - O, \\ \qquad j = 1, \ldots, K - O, \end{cases} \quad \text{[Equation 12]}$$

The product of the same codeword is 1 in the transmitting side/receiving side. A codeword thereof and another codeword are not orthogonal in a complementary set of the orthogonal subset of the same codebook.

Herein, the complementary set of the orthogonal subset, i.e., $OC^c$, does not always include a non-orthogonality feature. For example, an orthogonality condition may be satisfied between some codewords of the complementary set of the orthogonal subset, i.e., $OC^c$. In addition, the orthogonality condition may also be satisfied between a codeword of $OC^c$ and a codeword of OC.

In the aforementioned scheme, all of the non-orthogonal codewords may not be used according to the required traffic or degree of interference. For example, if the superposition factor K is not used to the maximum extent possible due to a change of an interference amount based on a change of a traffic amount or a change of a channel environment, a NOMA or OMA operation may be adaptively utilized on a given resource. Since an overloading factor is adaptively adjusted according to the above scheme, ISI or IUI can be controlled, and subset selection of a codebook is possible within a range which satisfies a target BLER.

The subset of the codebook may be defined according to the overloading factor, and an orthogonal subset is configured if the overloading factor≤1. If the overloading factor>1, a non-orthogonal subset is configured, and the subset of the codebook may be configured according to a superposition degree.

Figure 10:
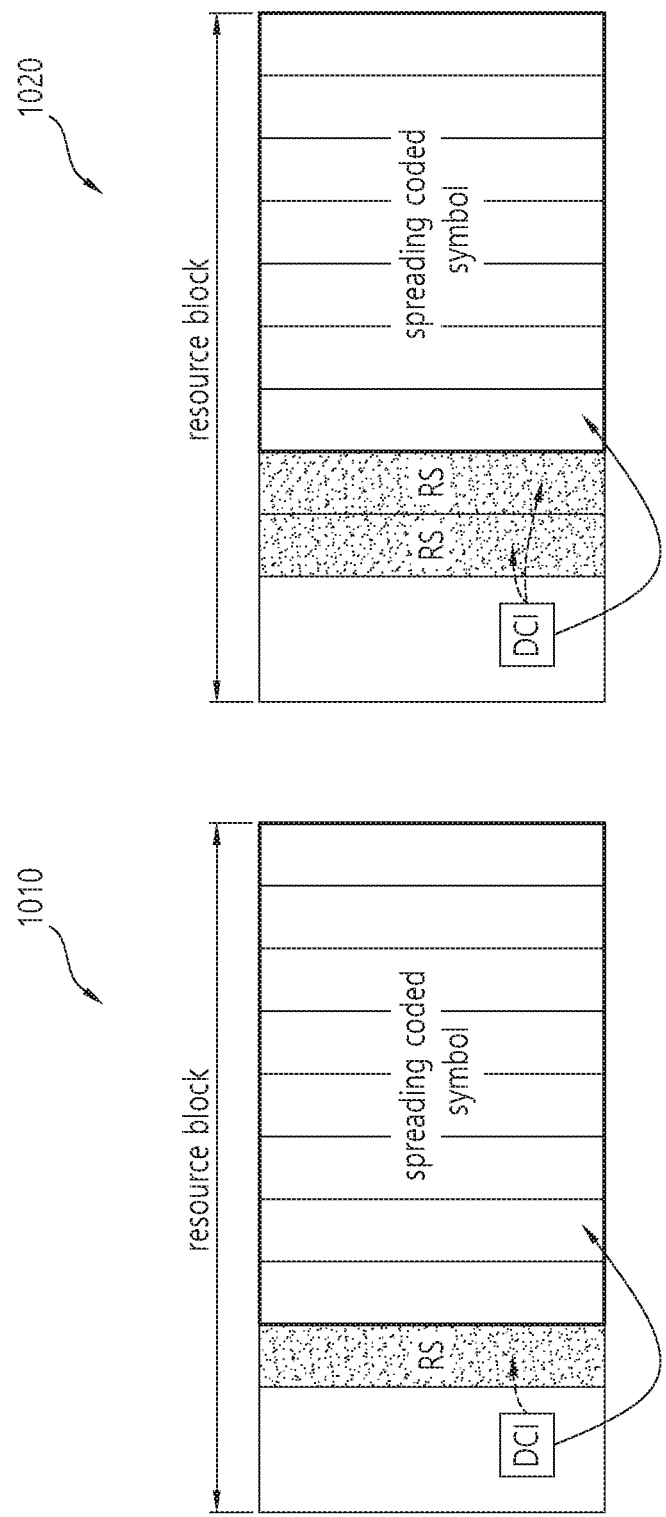
FIG. 10 shows an example of a change in a reference signal symbol according to a codebook subset index.

FIG. 10 shows an example of a change in a reference signal symbol according to a codebook subset index.

As described above, a transmitting side may perform codebook subset selection, and may transmit a codebook subset index through control information (e.g., DCI). In addition, the control information may include codeword allocation information for a single user or multiple users.

In the aforementioned method, if the overloading factor does not exceed 1 due to the codebook subset or if the number of single users or multiple users is less than N, as shown in a left diagram 1010 of FIG. 10, a channel corresponding to each codeword may be detected with one reference symbol (RS) (or reference signal symbol) or one reference pattern. On the other hand, if the overloading factor exceeds 1 and if the number of multiple users is greater than N, as shown in a right diagram 1020 of FIG. 10, multiple reference symbols or multiple reference patterns may be required.

For example, the followings are performed through codebook subset selection.

(1) Upon transmitting a subset index configured of A codewords of which an overloading factor does not exceed 1, if a single user receives symbols corresponding to all codewords, a receiving side performs channel detection through one RS, and detects a desired symbol through a UE specific spreading code without an MUD operation.

(2) Upon transmitting a subset index configured of B codewords of which an overloading factor exceeds 1, if a single user receives symbols corresponding to all codewords, a receiving side performs channel detection through one RS, and detects each desired symbol by performing MUD (in case of the single user, interference cancellation, e.g., SIC or PIC, etc.).

(3) Upon transmitting a subset index configured of A codewords of which an overloading factor does not exceed 1, if C multiple users (where C does not exceed N) receive symbols corresponding to the A codewords, a receiving side performs channel detection through C RSs, and detects a desired symbol through a UE specific spreading code without an MUD operation.

(4) Upon transmitting a subset index configured of B codewords of which an overloading factor exceeds 1, if C multiple users (where C does not exceed N) receive symbols corresponding to all codewords, a receiving side performs channel detection through C RSs, and detects each desired symbol by performing MUD.

(5) Upon transmitting a subset index configured of B codewords of which an overloading factor exceeds 1, if D multiple users (where D exceeds N) receive symbols corresponding to the B codewords, a receiving side performs channel detection through D RSs, and detects a desired symbol through a UE specific spreading code without an MUD operation.

In the above case, the C RSs may be defined as one RS symbol or RS pattern since C does not exceed N. For example, since the RS can be identified with up to N orthogonal sequences, channel estimation is possible with one RS allocation as shown in the left diagram 1010 of FIG. 10 by superposing the C RSs with an orthogonal sequence.

In the above case, the D RSs cannot be defined as one RS symbol or RS pattern since D exceeds N. For example, since the RS can be identified with up to N orthogonal sequences, for (D-N) RSs, an additional RS shall be allocated as shown in the right diagram 1020 of FIG. 10.

In the above case, since the D RSs exceed N, the RS can be identified with D non-orthogonal sequences. In this case, channel estimation performance deteriorates since orthogonality between the RSs cannot be guaranteed.

In the aforementioned methods, an RS pattern, a superposition scheme, an arrangement scheme, or the like may be various.

The followings are performed for operation of the above method.

(1) A receiving side (UE) feeds back a CQI report and/or a buffer state report (BSR) to a transmitting side (eNB) through uplink control information (UCI).

(2) The transmitting side performs optimal codebook subset selection in terms of a traffic amount and an interference amount.

(3) The transmitting side transmits a codebook subset index through control information (DCI), configures the number of symbols or a pattern of an RS based on a corresponding subset, and transmits data symbols with superposition based on the subset.

(4) The receiving side performs channel estimation on an RS symbol or a pattern based on the codebook subset index.

(5) A superposed data symbol is equalized based on the estimated channel, and a desired symbol is detected through interference cancellation or multi-user detection (MUD) based on a corresponding subset.

(5-1) If the overloading factor≤1 based on the codebook subset index, an MUD block of a receiving side does not operate, and a desired symbol is detected only through a UE specific spreading code.

(5-2) If the overloading factor>1 based on the codebook subset index, an MUD block of a receiving side operates, and a desired symbol is detected.

The above method is capable of transmitting single-user data with superposition by using one subset through information exchange between a single user and the eNB.

The above method is capable of transmitting multi-user data with superposition through information exchange between multiple users and the eNB by using a codeword in a division manner in one subset.

Although the method has been described in terms of a downlink situation, it is also equally applied to an uplink situation by transmitting a subset index or a codeword index by using DCI through scheduling of the eNB.

Hereinafter, an example of operating an orthogonal subset of a non-orthogonal codebook is described.

A case where a non-orthogonal codebook having a spreading factor of N=4 and a superposition factor of K=15 has an orthogonal subset is exemplified as follows.

$$C = [c^{(1)} \ \ldots \ c^{(15)}] \quad \text{[Equation 13]}$$

$$= \begin{bmatrix} c_1^{(1)} & \ldots & c_1^{(15)} \\ \vdots & \ddots & \vdots \\ c_4^{(1)} & \ldots & c_4^{(15)} \end{bmatrix}$$

$$= \begin{bmatrix} 1 & 1 & 1 & 1 & 0 & 1 & 1 & 1 & 0 & 0 & 0 & 1 & 0 & 0 & 0 \\ 1 & 1 & 1 & 0 & 1 & 1 & 0 & 0 & 1 & 1 & 0 & 0 & 1 & 0 & 0 \\ 1 & 1 & 0 & 1 & 1 & 0 & 1 & 0 & 1 & 0 & 1 & 0 & 0 & 1 & 0 \\ 1 & 0 & 1 & 1 & 1 & 0 & 0 & 1 & 0 & 1 & 1 & 0 & 0 & 0 & 1 \end{bmatrix}$$

A subset for a codebook may be classified as follows, according to a change of required traffic of a UE or an interference change depending on a channel change.

[Equation 14]

Subset 1 ($K = 4$):

$$OC = [c^{(12)} \ldots c^{(15)}]$$
$$= \begin{bmatrix} c_1^{(12)} & \ldots & c_1^{(15)} \\ \vdots & \ddots & \vdots \\ c_4^{(12)} & \ldots & c_4^{(15)} \end{bmatrix}$$
$$= \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

Subset 2 ($K = 6$):

$$NC1 = [c^{(6)} \ldots c^{(11)} \ldots c^{(15)}]$$
$$= \begin{bmatrix} c_1^{(6)} & c_1^{(11)} & \ldots & c_1^{(15)} \\ \vdots & \vdots & \ddots & \vdots \\ c_4^{(12)} & c_4^{(11)} & \ldots & c_4^{(15)} \end{bmatrix}$$
$$= \begin{bmatrix} 1 & 0 & 1 & 0 & 0 & 0 \\ 1 & 0 & 0 & 1 & 0 & 0 \\ 0 & 1 & 0 & 0 & 1 & 0 \\ 0 & 1 & 0 & 0 & 0 & 1 \end{bmatrix}$$

Subset 3 ($K = 8$):

$$NC2 = [c^{(6)} \ c^{(7)} \ c^{(10)} \ldots c^{(15)}]$$
$$= \begin{bmatrix} c_1^{(6)} & c_1^{(7)} & c_1^{(10)} & \ldots & c_1^{(15)} \\ \vdots & \vdots & \vdots & \ddots & \vdots \\ c_4^{(6)} & c_4^{(7)} & c_4^{(10)} & \ldots & c_4^{(15)} \end{bmatrix}$$
$$= \begin{bmatrix} 1 & 1 & 0 & 0 & 1 & 0 & 0 & 0 \\ 1 & 0 & 1 & 0 & 0 & 1 & 0 & 0 \\ 0 & 1 & 0 & 1 & 0 & 0 & 1 & 0 \\ 0 & 0 & 1 & 1 & 0 & 0 & 0 & 1 \end{bmatrix}$$

Subset 4 ($K = 10$):

$$NC3 = [c^{(6)} \ldots c^{(15)}]$$
$$= \begin{bmatrix} c_1^{(6)} & \ldots & c_1^{(15)} \\ \vdots & \ddots & \vdots \\ c_4^{(6)} & \ldots & c_4^{(15)} \end{bmatrix}$$
$$= \begin{bmatrix} 1 & 1 & 1 & 0 & 0 & 0 & 1 & 0 & 0 & 0 \\ 1 & 0 & 0 & 1 & 1 & 0 & 0 & 1 & 0 & 0 \\ 0 & 1 & 0 & 1 & 0 & 1 & 0 & 0 & 1 & 0 \\ 0 & 0 & 1 & 0 & 1 & 1 & 0 & 0 & 0 & 1 \end{bmatrix}$$

Subset 5 ($K = 14$):

$$NC4 = [c^{(2)} \ldots c^{(15)}]$$
$$= \begin{bmatrix} c_1^{(2)} & \ldots & c_1^{(15)} \\ \vdots & \ddots & \vdots \\ c_4^{(2)} & \ldots & c_4^{(15)} \end{bmatrix}$$
$$= \begin{bmatrix} 1 & 1 & 1 & 0 & 1 & 1 & 1 & 0 & 0 & 0 & 1 & 0 & 0 & 0 \\ 1 & 1 & 0 & 1 & 1 & 0 & 0 & 1 & 1 & 0 & 0 & 1 & 0 & 0 \\ 1 & 0 & 1 & 1 & 0 & 1 & 0 & 1 & 0 & 1 & 0 & 0 & 1 & 0 \\ 0 & 1 & 1 & 1 & 0 & 0 & 1 & 0 & 1 & 1 & 0 & 0 & 0 & 1 \end{bmatrix}$$

The subset 1 is an orthogonal subset of which a spreading factor is 4 and a superposition factor is 4. Accordingly, the subset 1 has an overloading factor of 1, and is configured without superposition in terms of one element. On the other hand, the subset 2 has a superposition factor of 6 and an overloading factor of 6/4, and has a superposition degree of 2 in terms of one element. The subset 3 has a superposition factor of 8 and an overloading factor of 8/4, and has a superposition degree of 3 in terms of one element. The subset 4 has a superposition factor of 10 and an overloading factor of 10/4, and has a superposition degree of 4 in terms of one element. The subset 5 has a superposition factor of 14 and an overloading factor of 14/4, and has a superposition degree of 5 in terms of one element. In addition, in case of using the entire codebook of which a superposition factor K is 15, an overloading factor is 15/4, and a superposition degree is 6 in terms of one element. An embodiment for the codebook subset is expressed in the form of 3GPP TS 36.211 as follows.

TABLE 3

| Subset Index | Spreading Factor (N) | Superposition Factor (K) | Generalizations | Codewords |
|---|---|---|---|---|
| 0 | 4 | 15 | $[c^{(1)} \ \ldots \ c^{(15)}]$ | $\begin{bmatrix} 1 & 1 & 1 & 1 & 0 & 1 & 1 & 1 & 0 & 0 & 0 & 1 & 0 & 0 & 0 \\ 1 & 1 & 1 & 0 & 1 & 1 & 0 & 0 & 1 & 1 & 0 & 0 & 1 & 0 & 0 \\ 1 & 1 & 0 & 1 & 1 & 0 & 1 & 0 & 1 & 0 & 1 & 0 & 0 & 1 & 0 \\ 1 & 0 & 1 & 1 & 1 & 0 & 0 & 1 & 0 & 1 & 1 & 0 & 0 & 0 & 1 \end{bmatrix}$ |
| 1 | 4 | 4 | $[c^{(12)} \ \ldots \ c^{(15)}]$ | $\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

TABLE 3-continued

| Subset Index | Spreading Factor (N) | Superposition Factor (K) | Generalizations | Codewords |
|---|---|---|---|---|
| 2 | 4 | 6 | $[c^{(6)} \ c^{(11)} \ \ldots \ c^{(15)}]$ | $\begin{bmatrix} 1 & 0 & 1 & 0 & 0 & 0 \\ 1 & 0 & 0 & 1 & 0 & 0 \\ 0 & 1 & 0 & 0 & 1 & 0 \\ 0 & 1 & 0 & 0 & 0 & 1 \end{bmatrix}$ |
| 3 | 4 | 8 | $[c^{(6)} \ c^{(7)} \ c^{(10)} \ \ldots \ c^{(15)}]$ | $\begin{bmatrix} 1 & 1 & 0 & 0 & 1 & 0 & 0 & 0 \\ 1 & 0 & 1 & 0 & 0 & 1 & 0 & 0 \\ 0 & 1 & 0 & 1 & 0 & 0 & 1 & 0 \\ 0 & 0 & 1 & 1 & 0 & 0 & 0 & 1 \end{bmatrix}$ |
| 4 | 4 | 10 | $[c^{(6)} \ \ldots \ c^{(15)}]$ | $\begin{bmatrix} 1 & 1 & 1 & 0 & 0 & 0 & 1 & 0 & 0 & 0 \\ 1 & 0 & 0 & 1 & 1 & 0 & 0 & 1 & 0 & 0 \\ 0 & 1 & 0 & 1 & 0 & 1 & 0 & 0 & 1 & 0 \\ 0 & 0 & 1 & 0 & 1 & 1 & 0 & 0 & 0 & 1 \end{bmatrix}$ |
| 5 | 4 | 14 | $[c^{(2)} \ \ldots \ c^{(15)}]$ | $\begin{bmatrix} 1 & 1 & 1 & 0 & 1 & 1 & 1 & 0 & 0 & 0 & 1 & 0 & 0 & 0 \\ 1 & 1 & 0 & 1 & 1 & 0 & 0 & 1 & 1 & 0 & 0 & 1 & 0 & 0 \\ 1 & 0 & 1 & 1 & 0 & 1 & 0 & 1 & 0 & 1 & 0 & 0 & 1 & 0 \\ 0 & 1 & 1 & 1 & 0 & 0 & 1 & 0 & 1 & 1 & 0 & 0 & 0 & 1 \end{bmatrix}$ |

The subset selection shall be performed in such a manner that the higher the traffic required through the subset, the higher the overloading factor in use, and the worse the channel situation, the lower the superposition degree. The higher the superposition degree, the better the performance of interference cancellation or MUI required. An optimal codebook subset shall be selected by considering the above feature.

Although the above example has been described based on a binary codebook for convenience of explanation, obviously, it is also equally applicable to an orthogonal/non-orthogonal codebook based on a complex coefficient.

A contention based transmission environment is assumed in the present specification. Herein, it is assumed that contention based transmission is in a state where DL synchronization is acquired through initial access, common control information is received, and an RACH procedure and an RRC connection are performed (It is assumed that a UE is in an RRC_CONNECTED state). Therefore, it is assumed a state where each UE acquires a C-RNTI but does not request a UL grant nor receive it.

In the above environment, the following decision is required in order for each UE to perform contention based data transmission.

1. A physical resource for contention based data transmission
2. A reference signal for contention based data transmission
3. A transmission scheme for contention based data transmission
4. A data scrambling scheme for contention based data transmission
5. A UE detection scheme of a receiving side for contention based data transmission Each of the above schemes may be used in a fixed manner or may be determined randomly by a transmitting side according to a system environment. When used in the fixed manner, complexity of a detection/decoding scheme of the receiving side may be decreased, but an eNB may transmit common information for a corresponding scheme or it shall be defined in a fixed manner in a system. Otherwise, when determined randomly by the transmitting side, the complexity of the detection/decoding scheme of the receiving side is increased, but the eNB decreases transmission of common information for a corresponding scheme, and collision for UE data transmission may be decreased according to a traffic situation. Therefore, each of the above schemes is defined and an operating scheme thereof is defined.

1. A Physical Resource for Contention Based Data Transmission

The physical resource for contention based data transmission is pre-defined through common control information. Since it is assumed in the present method that a UE which performs contention based transmission is in an RRC_CONNECTED state, it is assumed that system information is received after DL synchronization. An eNB broadcasts contention based data transmission to all UEs through common control information. Herein, a contention based data transmission zone may exist periodically or non-periodically, and a UE transmits data through the contention zone at a time at which traffic occurs. Data transmission of the UE may be transmitted one time in a single contention zone, or may be transmitted multiple times for multiple contention zones.

If there is no definition on the contention based data transmission zone and thus transmission is performed by selecting any resource, collision may occur with data transmission of a UE which has received a UL grant. Therefore, data transmission with selection of any resource causes a decrease in overall system performance.

The aforementioned physical resource may mean not only a single frequency/time resource but also a frequency/time resource block. For example, the physical resource may be a physical resource block (PRB).

In the above scheme, the definition is not for multiple physical resource existing in one contention based transmission zone but for all contention based transmission zones.

2. The Reference Signal for Contention Based Data Transmission

A reference signal for channel estimation is defined when each UE transmits data in the contention based data transmission zone defined in the section 1. In case of contention based data transmission, since a grant for data transmission is not received, the reference signal shall be selected and transmitted by the UE. Herein, the selection of the reference signal means that a signal is selected for channel estimation for data transmission of the UE from among all sets of reference signals based on a scheme such as TDM/FDM/CDM or the like. For example, it is assumed that there are 12 DMRS sequences that can be used in one contention based data transmission zone due to cyclic shift (CS) or orthogonal code cover (OCC) in a system in which a Zadoff-Chu sequence is used as a DMRS (herein, descriptions of the definition on the DMRS by a cell ID and the definition on the DMRS for multiple antennas based on an operation in a single cell are excluded). Then, the UE selects any one DMRS sequence from among the 12 DMRS sequences. Herein, in case of considering transmission for multiple layers, the UE may randomly select multiple DMRS sequences.

In the above scheme, the selection of the DMRS sequence may be achieved in association with a C-RNTI of the UE. For example, DMRS selection of a UE k may be defined as follows: DMRS_INDEX=mod (C-RNTI(k), Maximum DMRS_INDEX), where C-RNTI(k) is the C-RNTI of the UE k, and Maximum DMRS_INDEX is the total number of DMRS sequences (12 in the above example). If a DMRS set is defined by a cell ID in the above scheme, the above operation is performed in one set corresponding to a single cell.

In the above scheme, if the total number of DMRS sequences to be described below in the section 3.2 is greater than the total number of contention resources, all DMRS sequences may not be used for 1:1 mapping of the DMRS sequence and the contention resource. For example, assume that N=(Maximum DMRS_INDEX)/(Maximum Codeword_INDEX). Herein, Maximum Codeword_INDEX is the number of codewords corresponding to the total number of contention resources. Then, the selection of the DMRS sequence may be defined as follows: DMRS_INDEX=mod (C-RNTI, Maximum Codeword_INDEX)*N-1. Under the above definition, if it is assumed that an index of the DMRS sequence is defined sequentially by CS, it may be selected in association with a maximum codeword index while intermittently using a CS value to the maximum extent possible. For example, if the maximum number of codewords is 3 and the maximum number of DMRSs is 12, DMRS_INDEX is 3, 7, or 11 when the codeword is 1, 2, or 3 according to C-RNTI.

3. The Transmission Scheme for Contention Based Data Transmission

A data transmission method is defined when each UE transmits data based on a DMRS defined in the section 2, in the contention based data transmission zone defined in the section 1. Herein, the data transmission scheme includes the selection for multiple contention resources in the contention based data transmission zone. Herein, a contention resource may be various such as time, frequency, a codeword (or sequence), power, scrambling, interleaver, a spatial resource, or the like. In case of contention based data transmission, since a grant for data transmission is not received, a resource for data transmission shall be selected and transmitted by the UE from among the contention resources. For example, it is assumed that there are 12 codeword resources in a state of sharing the aforementioned time, frequency, or the like in one contention zone. Then, the UE may perform data transmission by randomly selecting one codeword from among the 12 codewords. Herein, the codeword allows a receiving side to detect and decode data transmitted with each codeword since data is transmitted with a different codeword on the same physical resource in the same content zone.

In the above scheme, the section of the contention resource (the selection of the codeword in the above example) may be achieved in association with a C-RNTI of the UE. For example, codeword selection of a UE k may be defined as follows: Codeword_INDEX=mod(C-RNTI(k), Maximum Codeword_INDEX), where C-RNTI(k) is Maximum Codeword_INDEX of the UE k, and Maximum DMRS_INDEX is the total number of codewords (12 in the above example) corresponding to the total number of contention resources. If a codeword set is defined by a cell ID in the above scheme, the above operation is performed in one set corresponding to a single cell.

In the above scheme, the section of the contention resource (the selection of the codeword in the above example) may be achieved in association with a DMRS of the UE. For example, the selection of the codeword of the UE k may be defined as follows:

3.1. Case 1: Maximum DMRS_INDEX=Maximum Codeword_INDEX

Case 1 is a case where the total number of DMRSs is equal to the total number of contention resources (the total number of codewords in the above example). In this case, a DMRS sequence and a contention resource may be 1:1 mapped. For example, Codeword_INDEX=DMRS_INDEX. For example, if the maximum number of codewords is 12 and the maximum number of DMRSs is 12, DMRS_INDEX is 1 when the codeword is 1 according to C-RNTI. When applied as described above, if the DMRS sequence does not collide due to multiple users, the collision of the codeword does not occur. In addition, when data is decoded by the UE through blind detection of the DMRS, data decoding may be performed based on a mapped codeword without blind detection. This will be exemplified as shown in FIG. 11.

Figure 11:
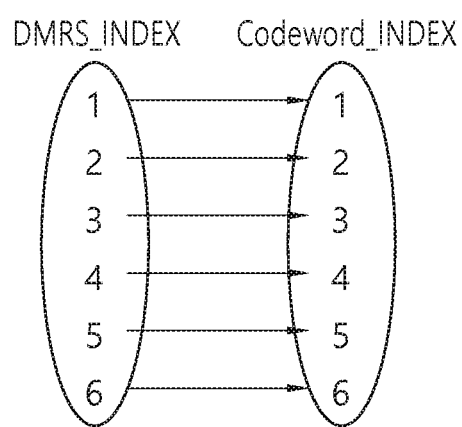
FIG. 11 shows an example in which a DMRS and a codeword are 1:1 mapped.

FIG. 11 shows an example in which a DMRS and a codeword are 1:1 mapped.

If a DMRS sequence and a contention resource are not mapped, blind detection of a codeword is additionally required for data decoding after blind detection of a DMRS. In addition, collision of the codeword may occur even if there is no collision of the DMRS sequence. In this case, even if channel estimation is normally achieved, MUD performance may not be guaranteed in a receiving side due to the collision of the codeword. Alternatively, even if the collision of the DMRS sequence occurs, there may be no collision of the codeword. In this case, MUD may be possible by using another codeword, but MUD performance is not guaranteed since channel estimation is not normally achieved.

In addition, since a collision ratio of the DMRS and a collision ratio of the codeword operates independently, the total collision ratio may be increased. For example, if the DMRS sequence and the contention resource are mapped, a probability that there is no collision in both the DMRS and the codeword in contention based transmission of two UEs is 11/12 in the above example. Otherwise, if the DMRS sequence and the contention resource are not mapped, the probability that there is no collision in both the DMRS and the codeword is 121/144. Therefore, when there is no collision even in any one of the DMRS and the codeword, a mapping scheme of the DMRS sequence and the contention resource is preferred in terms of a collision ratio in an environment where decoding performance enabling MUD is not guaranteed.

On the other hand, when there is no collision even in any one of the DMRS and the codeword, mapping of the DMRS sequence and the contention resource may not be assumed in an environment where decoding performance enabling MUD is guaranteed (i.e., an environment where MUD performance is guaranteed). For example, when the DMRS sequence and the contention resource are mapped, the probability that the collision occurs in both the DMRS and the codeword in the contention based transmission of the two UEs in the above example is 1/12. Otherwise, if the DMRS sequence and the contention resource are not mapped, the probability that the collision occurs in both the DMRS and the codeword is 1/144. Therefore, in an environment where MUD performance is guaranteed and blind detection complexity of the receiving side is not accepted, the DMRS sequence and the contention resource are not mapped, and a codeword index may be randomly selected.

3.2. Case 2: Maximum DMRS_INDEX>Maximum Codeword_INDEX

Case 2 is a case where the total number of DMRSs is greater than the total number of contention resources (the total number of codewords in the above example). In this case, the DMRS sequence and the contention resource may be N:1 or 1:1 mapped.

Figure 12:
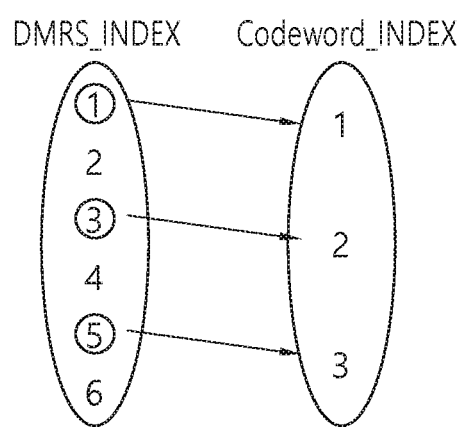
FIG. 12 shows another example in which a DMRS and a codeword are 1:1 mapped.

FIG. 12 shows another example in which a DMRS and a codeword are 1:1 mapped.

For example, in a 1:1 mapping case, for 1:1 mapping of a DMRS sequence and a contention resource, all DMRS sequences may not be used. Assume that N=(Maximum DMRS_INDEX)/(Maximum Codeword_INDEX). Then, selection of the codeword may be defined as Codeword_INDEX=mod(C-RNTI, Maximum Codeword_INDEX), and selection of the DMRS sequence may be defined as DMRS_INDEX=mod(C-RNTI, Maximum Codeword_INDEX)*N−1. Under the above definition, if it is assumed that an index of the DMRS sequence is defined sequentially by CS, it may be selected in association with a maximum codeword index while intermittently using a CS value to the maximum extent possible. For example, if the maximum number of codewords is 3 and the maximum number of DMRSs is 12, DMRS_INDEX is 3, 7, or 11 when the codeword is 1, 2, or 3 according to C-RNTI. When applied as described above, if the DMRS sequence does not collide due to multiple users, the collision of the codeword does not occur. In addition, when data is decoded by the UE through blind detection of the DMRS, data decoding may be performed based on a mapped codeword without blind detection. This will be exemplified as shown in FIG. 12.

Figure 13:
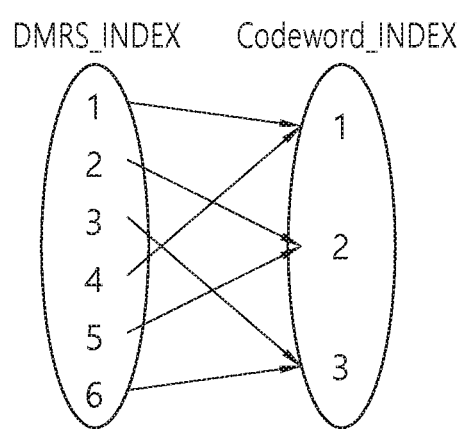
FIG. 13 shows an example in which a DMRS and a codeword are N:1 mapped.

FIG. 13 shows an example in which a DMRS and a codeword are N:1 mapped.

In addition, for example, in case of N:1 mapping, N DMRS sequences are mapped to one codeword for N:1 mapping of the DMRS sequence and the contention resource. Then, the selection of the codeword may be defined as: Codeword_INDEX=mod(DMRS_INDEX, Maximum Codeword_INDEX). For example, if the maximum number of codewords is 3 and the maximum number of DMRSs is 12, Codeword_INDEX is 1 when DMRS_INDEX is 1, 4, 7, or 10, and Codeword_INDEX is 2 when DMRS_INDEX is 2, 5, 8, or 11. When applied as described above, if data is decoded by the UE through blind detection of the DMRS, data decoding may be performed based on a mapped codeword without blind detection. In addition, when there is no collision in the DMRS sequence by multiple users, even if collision of the codeword occurs, MUD can be performed by decreasing a collision ratio of the DMRS to improve channel estimation performance (if channel estimation performance is guaranteed, MUD can be performed with a combining technique using MINO (e.g., MRC-IRC, MMSE-IRC, or the like) or an SIC scheme of the like using a power difference). This will be exemplified as shown in FIG. 13.

If a DMRS sequence and a contention resource are not mapped, blind detection of a codeword is additionally required for data decoding after blind detection of a DMRS. In addition, collision of the codeword may occur even if there is no collision of the DMRS sequence. In this case, even if channel estimation is normally achieved, MUD performance may not be guaranteed in a receiving side due to the collision of the codeword. Alternatively, even if the collision of the DMRS sequence occurs, there may be no collision of the codeword. In this case, MUD may be possible by using another codeword, but MUD performance is not guaranteed since channel estimation is not normally achieved.

In addition, since a collision ratio of the DMRS and a collision ratio of the codeword operates independently, the total collision ratio may be increased. For example, if the DMRS sequence and the contention resource are mapped, a probability that there is no collision in both the DMRS and the codeword in contention based transmission of two UEs is 2/3 in the above example. Otherwise, if the DMRS sequence and the contention resource are not mapped, the probability that there is no collision in both the DMRS and the codeword is 22/36. Therefore, when there is no collision even in any one of the DMRS and the codeword, a mapping scheme of the DMRS sequence and the contention resource is preferred in terms of a collision ratio in an environment where decoding performance enabling MUD is not guaranteed.

On the other hand, when there is no collision even in any one of the DMRS and the codeword, mapping of the DMRS sequence and the contention resource may not be assumed in an environment where decoding performance enabling MUD is guaranteed (i.e., an environment where MUD performance is guaranteed). For example, when the DMRS sequence and the contention resource are mapped, the probability that the collision occurs in both the DMRS and the codeword in the contention based transmission of the two UEs in the above example is 1/3. Otherwise, if the DMRS sequence and the contention resource are not mapped, the probability that the collision occurs in both the DMRS and the codeword is 1/36. Therefore, in an environment where MUD performance is guaranteed and blind detection complexity of the receiving side is not accepted, the DMRS sequence and the contention resource are not mapped, and a codeword index may be randomly selected.

There is a trade-off relation between the collision ratio and the MUD performance between the aforementioned 1:1 mapping and N:1 mapping. Therefore, a system may dynamically allocate optimal mapping by considering the collision ratio and the MUD performance, and DCI or common control may be used to indicate the entire system or specific NoMA resource region.

3.3. Case 3: Maximum DMRS_INDEX<Maximum Codeword_INDEX

Case 3 is a case where the total number of DMRSs is less than the total number of contention resources (the total number of codewords in the above example). In this case, a DMRS sequence and a contention resource may be 1:M mapped. For example, the selection of the codeword satisfies the following relation: DMRS_INDEX=[(Codeword_INDEX)/M](=ceil(Codeword_INDEX/M)). Herein, M=(Maximum Codeword_INDEX)/(Maximum DMRS_INDEX). For example, if the maximum number of codewords is 12 and the maximum number of DMRSs is 4, according to DMRS_INDEX, Codeword_INDEX is 1, 2, or 3 when DMRS_INDEX is 1, and Codeword_INDEX is 4, 5, or 6 when DMRS_INDEX is 2. When applied as described above, even if there is no collision of the DMRS sequence by multiple users, the collision of the codeword may occur. However, when data is decoded by the UE through blind detection of the DMRS, data decoding may be performed by decreasing the number of blind detection attempts to M based on a mapped codeword.

If a DMRS sequence and a contention resource are not mapped, blind detection of a codeword is additionally required for data decoding after blind detection of a DMRS. In addition, collision of the codeword may occur even if there is no collision of the DMRS sequence. In this case, even if channel estimation is normally achieved, MUD performance may not be guaranteed in a receiving side due to the collision of the codeword. Alternatively, even if the collision of the DMRS sequence occurs, there may be no collision of the codeword. In this case, MUD may be possible by using another codeword, but MUD performance is not guaranteed since channel estimation is not normally achieved.

In addition, since a collision ratio of the DMRS and a collision ratio of the codeword operates independently, the total collision ratio may be increased. For example, if the DMRS sequence and the contention resource are mapped, a probability that there is no collision in both the DMRS and the codeword in contention based transmission of two UEs is 2/3 in the above example. Otherwise, if the DMRS sequence and the contention resource are not mapped, the probability that there is no collision in both the DMRS and the codeword is 22/36. Therefore, when there is no collision even in any one of the DMRS and the codeword, a mapping scheme of the DMRS sequence and the contention resource is preferred in terms of a collision ratio in an environment where decoding performance enabling MUD is not guaranteed.

On the other hand, when there is no collision even in any one of the DMRS and the codeword, mapping of the DMRS sequence and the contention resource may not be assumed in an environment where decoding performance enabling MUD is guaranteed (i.e., an environment where MUD performance is guaranteed). For example, when the DMRS sequence and the contention resource are mapped, the probability that the collision occurs in both the DMRS and the codeword in the contention based transmission of the two UEs in the above example is 1/3. Otherwise, if the DMRS sequence and the contention resource are not mapped, the probability that the collision occurs in both the DMRS and the codeword is 1/36. Therefore, in an environment where MUD performance is guaranteed and blind detection complexity of the receiving side is not accepted, the DMRS sequence and the contention resource are not mapped, and a codeword index may be randomly selected.

4. The Data Scrambling Scheme for Contention Based Data Transmission

Contention based data transmission is not grant based data transmission and thus data of a UE is decoded in a state where a receiving side does not know a C-RNTI. Therefore, it is difficult to apply UE-specific scrambling for data transmission. When the UE-specific scrambling is applied, blind decoding shall be performed on the entire scrambling, and thus the blind detection of the receiving side causes significantly great complexity. Accordingly, in the contention based data transmission zone defined in the section 1, when each UE transmits data on the basis the DMRS defined in the section 2 and the contention resource defined in the section 3, scrambling for transmission data is defined.

4.1. A Scrambling Sequence is Generated by being 1:1 Mapped in Association with a DMRS Index or a Codeword Index.

When each UE transmits data based on the DMRS defined in the section 2 and the contention resource defined in the section 3 in the contention based data transmission zone defined in the section 1, generating of a scrambling sequence for transmission data is 1:1 mapped in association with a DMRS index or a codeword index. The above operation is applied in the same manner as the section 3.1, and also has the same effect.

4.2. A Scrambling Sequence is Generated by being 1:L Mapped in Association with a DMRS Index or a Codeword Index.

Figure 14:
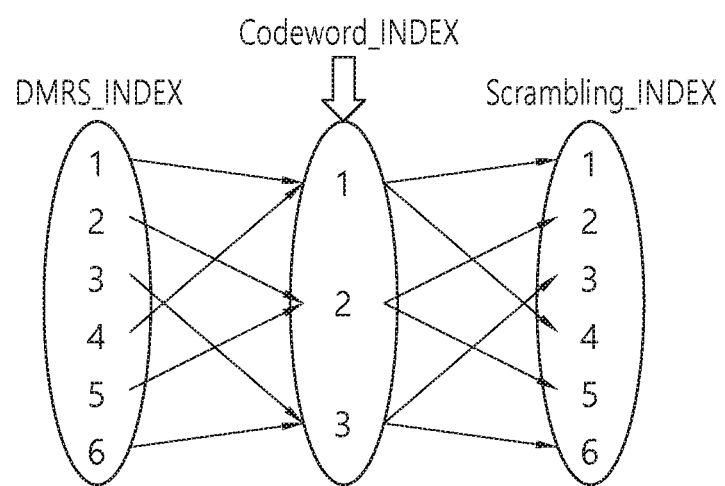
FIG. 14 shows an example in which a scrambling sequence is 1:L mapped in association with a DMRS and a codeword.

FIG. 14 shows an example in which a scrambling sequence is 1:L mapped in association with a DMRS and a codeword.

When each UE transmits data based on the DMRS defined in the section 2 and the contention resource defined in the section 3 in the contention based data transmission zone defined in the section 1, generating of a scrambling sequence for transmission data is 1:L mapped in association with a DMRS index or a codeword index. Herein, L may be defined to be greater than 1 to decrease a collision ratio according to a system environment. In this case, a receiving side shall perform L blind detection attempts for a scrambling sequence. The above operation is applied in the same manner as the section 3.1, and also has the same effect.

In the selection of the scrambling sequence, sequence generation may be associated with a cell ID and a DMRS. A base sequence may be generated based on the cell ID, and the base sequence may be generated by being tied with a DMRS specific scrambling sequence based on a DMRS index. For example, if it is 1:1 mapped with the DMRS, it may be expressed as shown in FIG. 14.

When the scrambling sequence is mapped in the aforementioned manner, multiple users use the same codeword since the number of codewords is small. Therefore, when MUD performance is not guaranteed, the MUD performance may be improved with scrambling.

Figure 15:
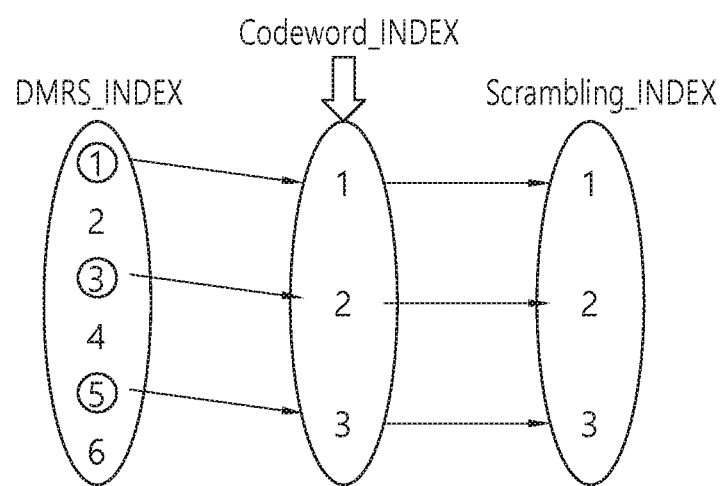
FIG. 15 shows an example in which a scrambling sequence is 1:1 mapped in association with a DMRS and a codeword.
Figure 16:
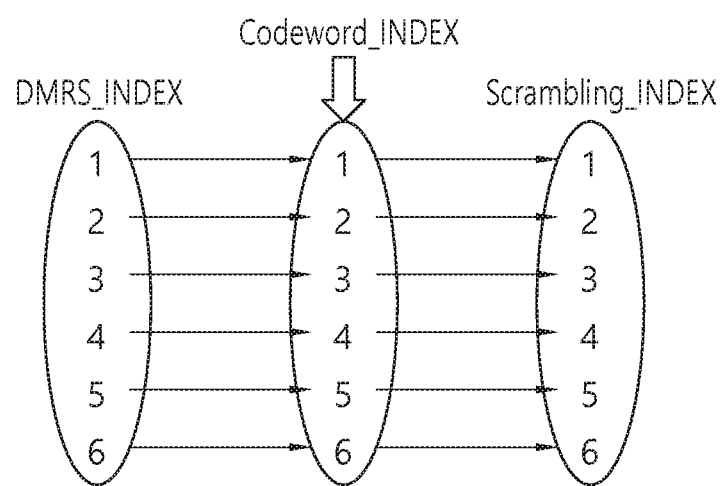
FIG. 16 shows another example in which a scrambling sequence is 1:1 mapped in association with a DMRS and a codeword.

Alternatively, the DMRS and codeword may be 1:1 mapped with the scrambling as shown in FIG. 15 and FIG. 16. FIG. 15 shows an example in which a scrambling sequence is 1:1 mapped in association with a DMRS and a codeword. FIG. 16 shows another example in which a scrambling sequence is 1:1 mapped in association with a DMRS and a codeword.

Figure 17:
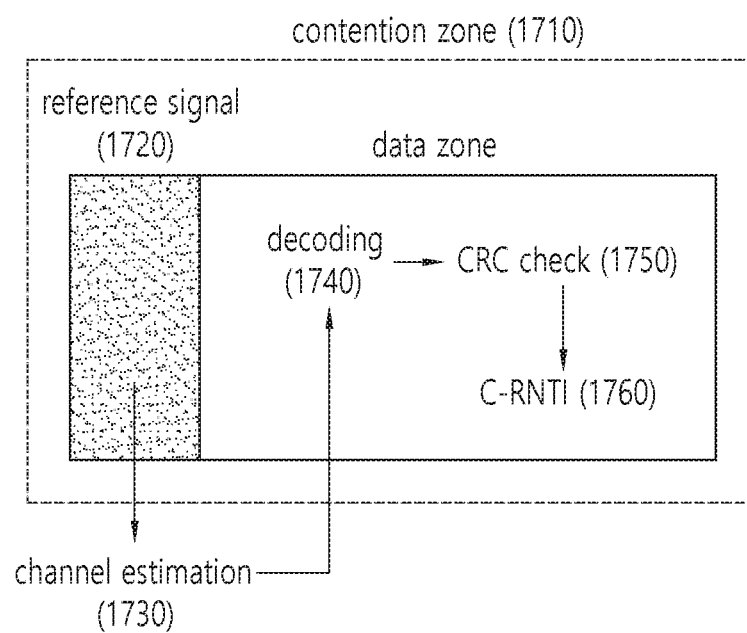
FIG. 17 shows an example of a UE detection scheme of a receiving side for contention based data transmission.

5. The UE Detection Scheme of the Receiving Side for Contention Based Data Transmission FIG. 17 shows an example of a UE detection scheme of a receiving side for contention based data transmission.

Contention based data transmission is not grant based data transmission and thus data of a UE is decoded in a state where a receiving side does not know a C-RNTI. Therefore, it is difficult to know a specific UE from which data is transmitted. Therefore, a C-RNTI may be transmitted by designating some fields in a data zone. For example, as shown in FIG. 17, channel estimation 1730 is performed by using a reference signal 1720 mentioned in the section 2 through a contention zone 1710 mentioned in the section 1, decoding 1740 is performed on data of the data zone for a transmission scheme mentioned in the section 3, and whether there is an error in the data is determined through a CRC check 1750. Upon passing the CRC check, C-RNTI information 1760 included in a predefined field in the data zone is acquired.

Figure 18:
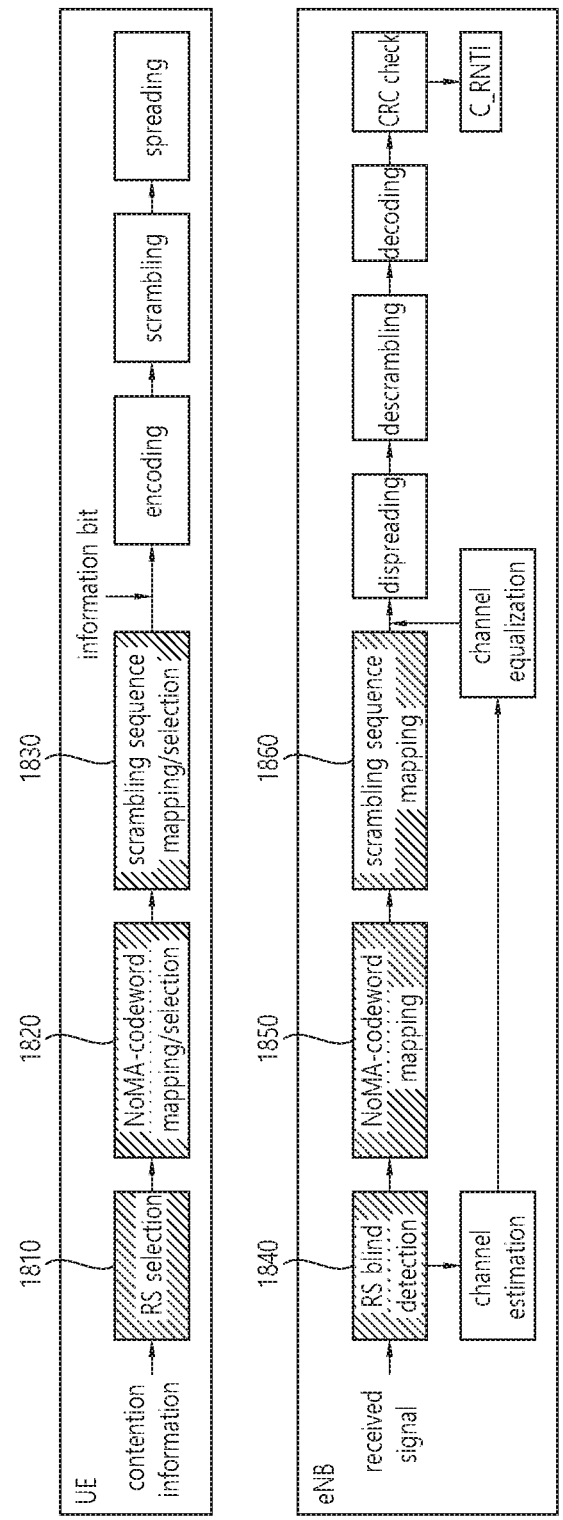
FIG. 18 is a block diagram showing the entire procedure for performing contention based transmission in a transmitting side and a receiving side.

The entire procedure mentioned above is summarized as shown in FIG. 18. FIG. 18 is a block diagram showing the entire procedure for performing contention based transmission in a transmitting side and a receiving side.

Referring to FIG. 18, a UE first selects an RS for channel estimation when contention information is transmitted (1810, the scheme of the section 2). There may be a codeword resource in a state where a resource such as time, frequency, or the like is shared in one contention zone. Therefore, the UE maps the RS and a NoMA codeword, and randomly selects one codeword (1820, the scheme of the section 3). Alternatively, contention based data transmission causes significantly great complexity since blind decoding shall be performed on the entire scrambling in a receiving side (eNB). Therefore, the UE may generate a scrambling sequence by mapping it with an RS (DMRS) index or a (NoMA) codeword index (1830, the scheme of the section 4). The UE delivers an information bit subjected to the above procedure to the receiving side (eNB) through encoding, scrambling, and spreading procedures.

The eNB performs blind detection on the RS by using a received signal to perform channel estimation through the RS (1840), verifies a mapping relation of the RS and NoMA codeword and the scrambling sequence to perform channel equalization (1850, 1860), and thereafter performs dispreading, descrambling, and decoding on received data. Finally, the eNB determines whether there is an error in the data through a CRC check, and upon passing the CRC check, acquires C-RNTI information included in a field defined in a data zone.

The aforementioned methods are methods related to initial contention based data transmission. However, if the UE performs retransmission in a data NACK situation caused by insufficient SNR, collision, or the like for a received signal, a receiving eNB may select a contention resource such as MA signature or the like in the same manner. In this case, data NACK may appear repeatedly due to the same problem. Accordingly, there is a need for a collision avoidance technique. In addition, since the schemes perform contention based data transmission, it is difficult for the receiving eNB to know a specific UE from which contention based data transmission is performed. Accordingly, a C-RNTI field for identifying a UE ID in the data zone is to be transmitted. The legacy LTE may support $2^{16}$ C-RNTIs. In this case, a 16-bit C-RNTI field is required. Therefore, a method capable of decreasing an information amount of the C-RNTI field may be required. In addition, although the aforementioned methods are applied to contention based data transmission, a scheme capable of decreasing a UL grant amount through DCI may be applied when operating in scheduling based data transmission.

Figure 19:
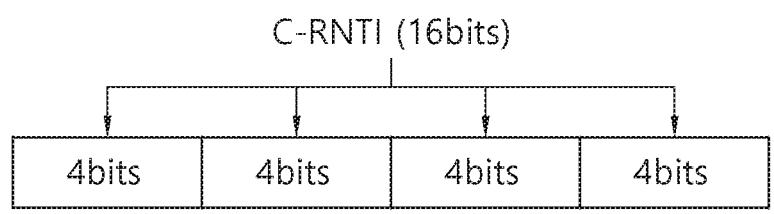
FIG. 19 shows an example of selecting a DMRS by dividing a C-RNTI according to the present embodiment.

Proposal 1: A UE Specific Selection Scheme for Collision Avoidance in Contention Based Data Transmission FIG. 19 shows an example of selecting a DMRS by dividing a C-RNTI according to the present embodiment.

The C-RNTI is allocated to UEs in an RRC_CONNECTED state. The C-RNTI is UE specific information, and is not superposed with another user. Therefore, collision does not occur if DMRS selection of contention based data transmission is performed based on the entire C-RNTI. However, although the number of C-RNTIs is $2^{16}$ in case of the legacy LTE, a physical resource may be insufficient to generate $2^{16}$ DMRSs. Therefore, a scheme of selecting the DMRS by dividing the C-RNTI is proposed. It is assumed that the C-RNTI consists of 16 bits and is used as UE specific information as described below.

The UE may perform DMRS selection for contention based data transmission as follows.

1st transmission: DMRS_INDEX(k)=mod(first 4 bits of C-RNTI(k), Maximum DMRS_INDEX) where Maximum DMRS_INDEX=16

$2^{nd}$ transmission: DMRS_INDEX(k)=mod(second 4 bits of C-RNTI(k), Maximum DMRS_INDEX)

3rd transmission: DMRS_INDEX(k)=mod(third 4 bits of C-RNTI(k), Maximum DMRS_INDEX)

$4^{th}$ transmission: DMRS_INDEX(k)=mod(fourth 4 bits of C-RNTI(k), Maximum DMRS_INDEX)

In the above operation, first (or second, third, fourth) 4 bits of C-RNTI(k) imply that a value obtained by being converted into decimal and then subjected to a modulo operation with Maximum DMRS_INDEX is used as a DMRS index (i.e., DMRS_INDEX(k)). Even if collision occurs in $1^{st}$ transmission through the above operation, a collision ratio is decreased through $2^{nd}$, $3^{rd}$, and $4^{th}$ transmissions, and UE-specific selection is achieved in the $4^{th}$ transmission.

Alternatively, DMRS selection may be performed as follows.

$1^{st}$ transmission: DMRS_INDEX(k)=mod(first 4 bits of C-RNTI(k), Maximum DMRS_INDEX) where Maximum DMRS_INDEX=16

2nd transmission: DMRS_INDEX(k)=mod(first 8 bits of C-RNTI(k), Maximum DMRS_INDEX)

$3^{rd}$ transmission: DMRS_INDEX(k)=mod(first 12 bits of C-RNTI(k), Maximum DMRS_INDEX)

$4^{th}$ transmission: DMRS_INDEX(k)=mod(Total 16 bits of C-RNTI(k), Maximum DMRS_INDEX)

In the above operation, first (or second, third, fourth) 4 bits of C-RNTI(k) imply that a value obtained by being converted into decimal and then subjected to a modulo operation with Maximum DMRS_INDEX is used as a DMRS index (i.e., DMRS_INDEX(k)). Even if collision occurs in $1^{st}$ transmission through the above operation, a collision ratio is decreased through $2^{nd}$, $3^{rd}$, and $4^{th}$ transmissions, and UE-specific selection is achieved in the $4^{th}$ transmission.

It is obvious that a UE specific DMRS selection pattern can be selected by combining bits of the C-RNTI according to another scheme for the above operation.

Figure 20:
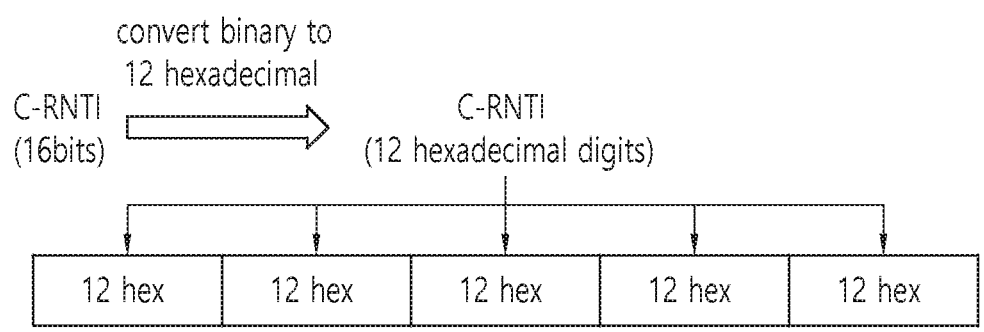
FIG. 20 shows another example of selecting a DMRS by dividing a C-RNTI according to the present embodiment.

FIG. 20 shows another example of selecting a DMRS by dividing a C-RNTI according to the present embodiment.

For the above operation, the maximum number of DMRSs may not be in the form of $2^n$. In this case, the above operation may be equally performed by dividing the C-RNTI for the maximum number of DMRSs. For example, assuming that the maximum number of DMRSs is 12, the C-RNTI may be converted into 12 hexadecimal (0, 1, 2, . . . , 9, A, B) as shown in FIG. 20.

Then, DMRS selection may be performed as follows.

$1^{st}$ transmission: DMRS_INDEX(k)=mod(fifth 12 hexadecimal of C-RNTI(k), Maximum DMRS_INDEX) where Maximum DMRS_INDEX=12

$2^{nd}$ transmission: DMRS_INDEX(k)=mod(fourth 12 hexadecimal of C-RNTI(k), Maximum DMRS_INDEX)

$3^{rd}$ transmission: DMRS_INDEX(k)=mod(third 12 hexadecimal of C-RNTI(k), Maximum DMRS_INDEX)

4th transmission: DMRS_INDEX(k)=mod(second 12 hexadecimal of C-RNTI(k), Maximum DMRS_INDEX)

5th transmission: DMRS_INDEX(k)=mod(first 12 hexadecimal of C-RNTI(k), Maximum DMRS_INDEX)

In the above operation, first (or second, third, fourth, fifth) 12 hexadecimals of C-RNTI(k) implies that a value obtained by being converted into decimal and then subjected to a modulo operation with Maximum DMRS_INDEX is used as a DMRS index (i.e., DMRS_INDEX(k)). Even if collision occurs in 1st transmission through the above operation, a collision ratio is decreased through 2nd, 3rd, 4th, and 5th transmissions, and UE-specific selection is achieved in the 5th transmission.

The DMRS selection may be performed on the aforementioned operation by performing a modulo operation corresponding to a size of a DMRS set with respect to C-RNTI information of the UE. For example, although a maximum DMRS index is 12, only DMRSs corresponding to 1, 3, 5, 7, 9, and 11 may be allocated and used among 12 DMRSs for the reason of DMRS detection caused by multi-path delay or performance deterioration of channel estimation or the like. In this case, since a size of a DMRS set used in practice is 6, the UE may perform DMRS selection for contention based data transmission as follows on a six decimal basis.

1st transmission: DMRS_INDEX(k)=mod(seventh 6 hexadecimal of C-RNTI(k), size of DMRS set) where size of DMRS set=6

2nd transmission: DMRS_INDEX(k)=mod(sixth 6 hexadecimal of C-RNTI(k), size of DMRS set)

3rd transmission: DMRS_INDEX(k)=mod(fifth 6 hexadecimal of C-RNTI(k), size of DMRS set)

4th transmission: DMRS_INDEX(k)=mod(fourth 6 hexadecimal of C-RNTI(k), size of DMRS set)

5th transmission: DMRS_INDEX(k)=mod(third 6 hexadecimal of C-RNTI(k), size of DMRS set)

6th transmission: DMRS_INDEX(k)=mod(second 6 hexadecimal of C-RNTI(k), size of DMRS set)

7th transmission: DMRS_INDEX(k)=mod(first 6 hexadecimal of C-RNTI(k), size of DMRS set)

The DMRS set used in practice may be agreed in advance or may be reported as a higher layer signal of an RRC level or a broadcasting signal or a UE specific control signal.

It is obvious that the aforementioned operation can achieve UE specific selection in another manner other than equal division for the C-RNTI. In addition, although the C-RNTI is described as UE specific information, the aforementioned operation is also equally applied to UE specific information. Since not all users corresponding to the C-RNTI are activated, group specific DMRS selection may be supported in terms of a system. For example, when multiple UEs are pre-configured as one group according to a specific condition or environment, a group-RNTI (G-RNTI) may be allocated to the multiple UEs. The UE may equally use a scheme of selecting a DMRS by dividing a group-RNTI (G-RNTI) based on the G-RNTI. Also in this case, a collision ratio for DMRS selection may be decreased according to a principle of the above operation.

In the aforementioned operation, DMRS selection may not occur only once at one time point. For example, when the UE transmits two different pieces of data through two DMRSs, the two DMRSs may be selected at one time point, and the two pieces of data may be transmitted with superposition in the same data region. That is, a transmission index of the UE may be an index of repetition or retransmission, or may be an HARQ process index or an index of a superposition layer.

Proposal 2: A Scheme of Combining a UE ID with a DMRS or Codeword for Decreasing an Information Amount for UE ID Transmission in Contention Based Data Transmission FIG. 21 shows another example of selecting a DMRS by dividing a C-RNTI according to the present embodiment.

In contention based data transmission, it is difficult for a receiving eNB to know a specific UE from which contention based data transmission is performed. Accordingly, a C-RNTI field 2120 for identifying a UE ID in the data zone is to be transmitted. The legacy LTE may support $2^{16}$ C-RNTIs. In this case, a 16-bit C-RNTI field is required. Therefore, a method capable of decreasing an information amount of the C-RNTI field is proposed. As mentioned in the proposal 1, the DMRS selection may be performed through a module operation with the C-RNTI. Accordingly, the C-RNTI may be derived by combining a DMRS index 2110 and the C-RNTI field 2120 in the data zone. Herein, the C-RNTI field 2120 may be not a field for expressing the entire C-RNTI 2100 but information reduced based on the combination with the DMRS index 2110. For example, an operation may be performed as shown in FIG. 21.

Figure 21:
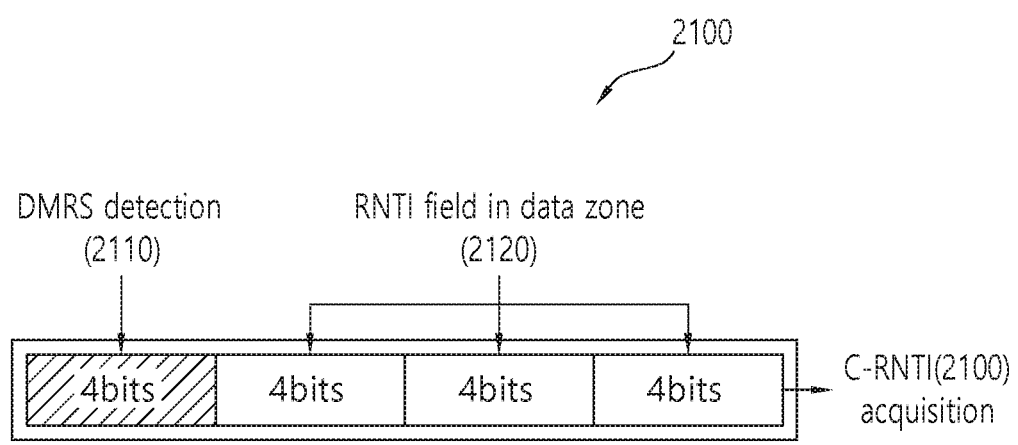
FIG. 21 shows another example of selecting a DMRS by dividing a C-RNTI according to the present embodiment.

As shown in FIG. 21, through blind detection for a DMRS, a receiving side may derive 4-bit information of a C-RNTI and derive 12-bit information through a C-RNTI field in a data zone to reconfigure and acquire a C-RNTI corresponding to 16 bits in total. Accordingly, a C-RNTI information amount may be decreased by 4 bits to improve spectral efficiency. Then, a UE may perform DMRS selection for contention based data transmission as follows.

1st transmission: DMRS_INDEX(k)=mod(first 4 bits of C-RNTI(k), Maximum DMRS_INDEX) where Maximum DMRS_INDEX=16

2nd transmission: DMRS_INDEX(k)=mod(second 4 bits of C-RNTI(k), Maximum DMRS_INDEX)

3rd transmission: DMRS_INDEX(k)=mod(third 4 bits of C-RNTI(k), Maximum DMRS_INDEX)

4th transmission: DMRS_INDEX(k)=mod(fourth 4 bits of C-RNTI(k), Maximum DMRS_INDEX)

That is, a receiving side (eNB) may perform auto-correlation on a DMRS through blind detection, and upon discovering a DMRS index exceeding a threshold, may perform channel equalization on a channel through the DMRS, thereby decreasing interference from another channel to the maximum extent possible.

In addition, the scheme of the proposal 2 may be possible since it is agreed between the UE and the eNB that the DMRS selection is performed as described in the proposal 1. In addition, it is also agreed between the UE and the eNB that a C-RNTI field reduced due to a DMRS detection field is transmitted with 12 bits. The receiving side may verify that there is a 16-bit C-RNTI by adding the DMRS detection field and the reduced C-RNTI field. That is, there is a change in a method of configuring C-RNTI information in terms of the UE, and there is a change in a method of detecting C-RNTI information in terms of the eNB.

The above operation may be equally performed by dividing a C-RNTI with respect to the maximum number of DMRSs as mentioned in the proposal 1 even if the DMRS is not expressed in the form of $2^n$.

Figure 22:
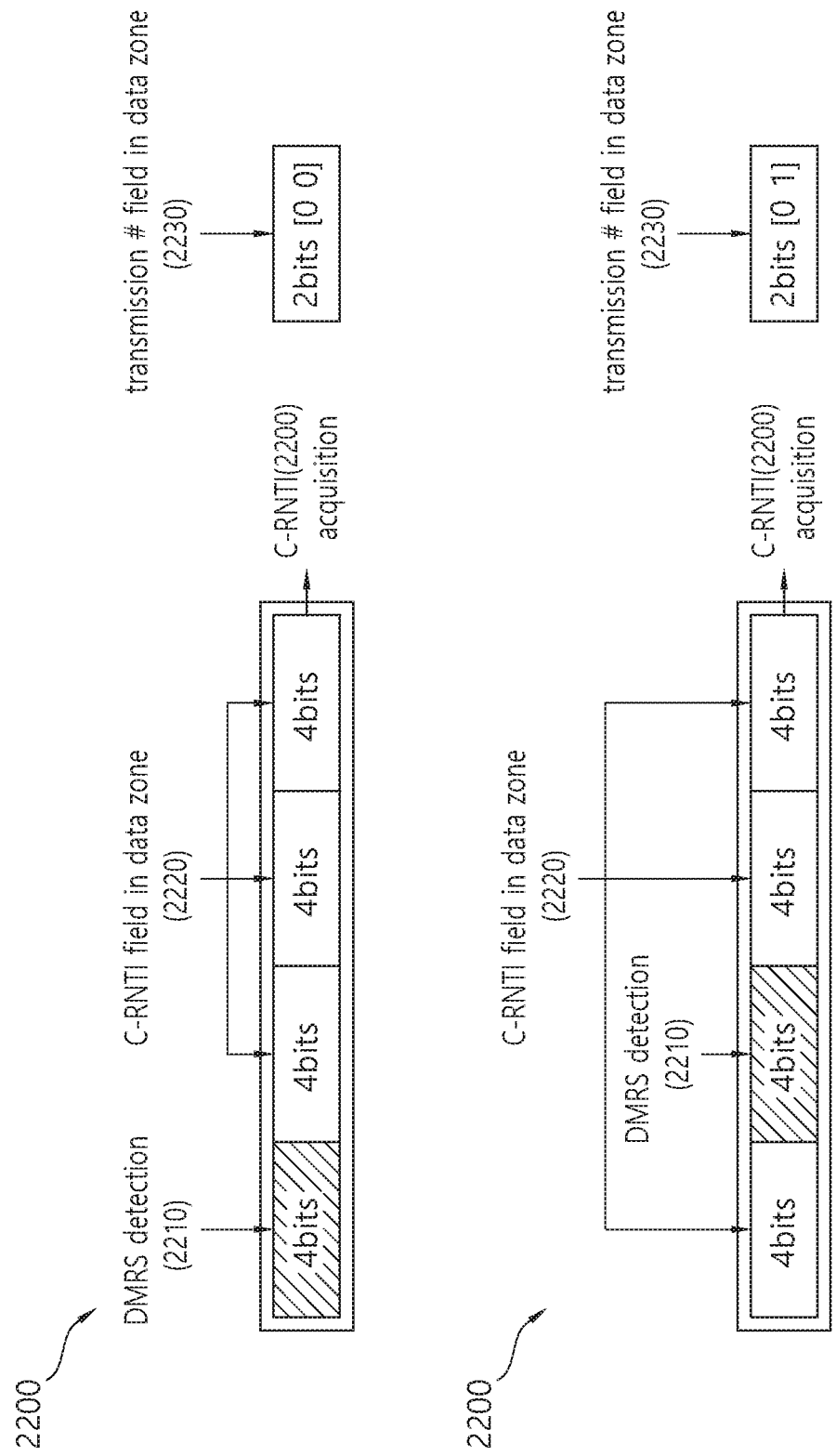
FIG. 22 shows another example of selecting a DMRS by dividing a C-RNTI according to the present embodiment.

FIG. 22 shows another example of selecting a DMRS by dividing a C-RNTI according to the present embodiment.

Considering retransmission, all operations mentioned in the proposal 1 may not be able to know at which order the transmission is performed in terms of an eNB. Therefore, a repetition count may be recognized when a transmission #field for designating repetition is transmitted in a data zone. For example, an operation may be performed as shown in FIG. 22. The transmission #field may be transmitted through a control channel tied in advance with the DMRS or tied in advance with the data zone or a UE-specific additional control channel.

FIG. 22 shows a case where a maximum repetition count is 4 and thus is expressed with 2 bits. According to the operation of FIG. 22, 4-bit C-RNTI information may be acquired through DMRS detection 2210, and 12-bit C-RNTI information may be acquired through a C-RNTI field 2220. Thereafter, a repetition count may be recognized through a transmission #field 2230 to perform C-RNTI combination 2200 according to the repetition count. Accordingly, a C-RNTI information amount may be decreased by 4 bits to improve spectral efficiency. Then, a UE may perform DMRS selection for contention based data transmission as follows.

$1^{st}$ transmission: DMRS_INDEX(k)=mod(first 4 bits of C-RNTI(k), Maximum DMRS_INDEX) where Maximum DMRS_INDEX=16, Transmission #field in Data Zone: [0 0]

$2^{nd}$ transmission: DMRS_INDEX(k)=mod(second 4 bits of C-RNTI(k), Maximum DMRS_INDEX), Transmission #field in Data Zone: [0 1]

$3^{rd}$ transmission: DMRS_INDEX(k)=mod(third 4 bits of C-RNTI(k), Maximum DMRS_INDEX), Transmission #field in Data Zone: [1 0]

$4^{th}$ transmission: DMRS_INDEX(k)=mod(fourth 4 bits of C-RNTI(k), Maximum DMRS_INDEX), Transmission #field in Data Zone: [1 1]

Only $1^{st}$ transmission in which a transmission #field is [0 0] and 2nd transmission in which a transmission #field is [0 1] are shown in FIG. 22.

The above operation may be equally performed by dividing a C-RNTI with respect to the maximum number of DMRSs as mentioned in the proposal 1 even if the DMRS is not expressed in the form of $2^n$.

Figure 23:
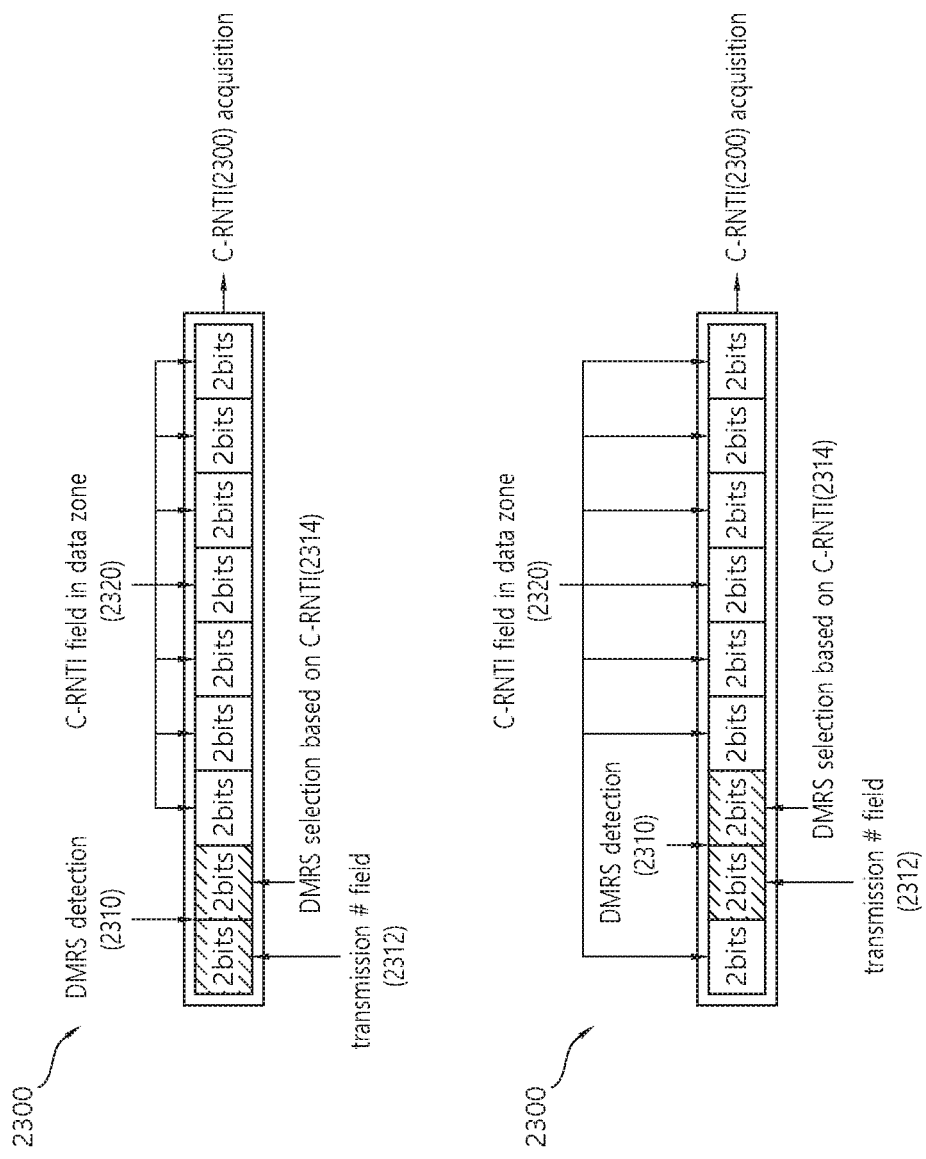
FIG. 23 shows another example of selecting a DMRS by dividing a C-RNTI according to the present embodiment.

FIG. 23 shows another example of selecting a DMRS by dividing a C-RNTI according to the present embodiment.

In addition, DMRS selection may represent a repetition count. For example, when the maximum number of DMRSs is 16 and thus 4-bit expression is possible, 2 bits 2312 are determined according to the repetition count, and selection of a DMRS index 2310 may be performed by combining values obtained through a module operation based on 2 bits 2314 of C-RNTI. This is exemplified as shown in FIG. 23.

A case where a maximum repetition count is 4 and thus 2-bit expression is achieved is shown in the above example. According to the operation of the above figure, a repetition count may be recognized through DMRS detection (2312), 2-bit C-RNTI information may be acquired (2314), and 14-bit C-RNTI information may be acquired through a C-RNTI field (2320) to perform C-RNTI combination (2300) according to the repetition count. Accordingly, a C-RNTI information amount may be decreased by 2 bits to improve spectral efficiency. Then, a UE may perform DMRS selection for contention based data transmission as follows.

$1^{st}$ transmission: DMRS_INDEX(k)=Repetiton_offset1+mod(first 2 bits of C-RNTI(k), Maximum DMRS_INDEX) where Maximum DMRS_INDEX=16, $2^{nd}$ transmission: DMRS_INDEX(k)=Repetiton_offset2+mod(second 2 bits of C-RNTI(k), Maximum DMRS_INDEX)

$3^{rd}$ transmission: DMRS_INDEX(k)=Repetiton_offset3+mod(third 2 bits of C-RNTI(k), Maximum DMRS_INDEX)

$4^{th}$ transmission: DMRS_INDEX(k)=Repetiton_offset4+mod(fourth 2 bits of C-RNTI(k), Maximum DMRS_INDEX)

Repetition_offset1=0(0000 in terms of 4 bits), Repetition_offset2=4(0010 in terms of 4 bits), Repetition_offset3=8(0100 in terms of 4 bits), and Repetition_offset4=12(0110 in terms of 4 bits) may be designated according to the transmission #field 2312.

In the aforementioned operation, DMRS selection may not occur only once at one time point. For example, when the UE transmits two different pieces of data through two DMRSs, the two DMRSs may be selected at one time point, and the two pieces of data may be transmitted with superposition in the same data region. That is, a transmission index of the UE may be an index of repetition or retransmission, or may be an HARQ process index or an index of a superposition layer. In this case, when multiple layers transmitted by a UE in a data zone share one C-RNTI field, an information amount of the C-RNTI field may be further decreased based on a prior agreement.

Proposal 3. A Scheme of Selecting a DMRS and a NoMA-Codeword to Decrease a UL Grant Information Amount in Scheduling Based Data Transmission Although all of the schemes mentioned above are described based on contention based transmission, the same scheme is also equally applied to scheduling based transmission. For example, in scheduling based transmission, a DMRS of a UE may be selected through a module operation with a C-RNTI.

DMRS_INDEX=mod (C-RNTI(k), Maximum DMRS_INDEX)

In the legacy LTE, a UL grant is transmitted in a DCI format 0, and a field for cyclic shift (CS) for a DMRS is transmitted with 3 bits in a UL grant field to designate 8 types of DMRS CS values. Accordingly, when a DMRS of a UE is selected through a modulo operation with a C-RNTI, an overhead for a grant can be decreased by omitting transmission of grant information for a DMRS in scheduling based transmission. In this case, an eNB shall perform scheduling considering DMRS selection of the UE.

Likewise, in the scheduling based transmission, a codeword of the UE may be determined based on DMRS selection. Then, the overhead for the grant can be decreased by omitting transmission of the grant information for the codeword. In this case, the eNB shall perform scheduling considering the codeword of the UE. In addition, the codeword selection may also be performed through the modulo operation with the C-RNTI.

Codeword_INDEX=mod (C-RNTI(k), Maximum Codeword_INDEX)

According to the above operations, since a DMRS and a codeword can be determined implicitly, a control overhead is decreased. On the other hand, if there are not many active UEs, diversity for scheduling may be decreased. For example, when two activate UEs cannot but to select the same DMRS or codeword by an implicit operation, an eNB cannot simultaneously perform scheduling on the two active UEs even if another DMRS or codeword is not used.

Figure 24:
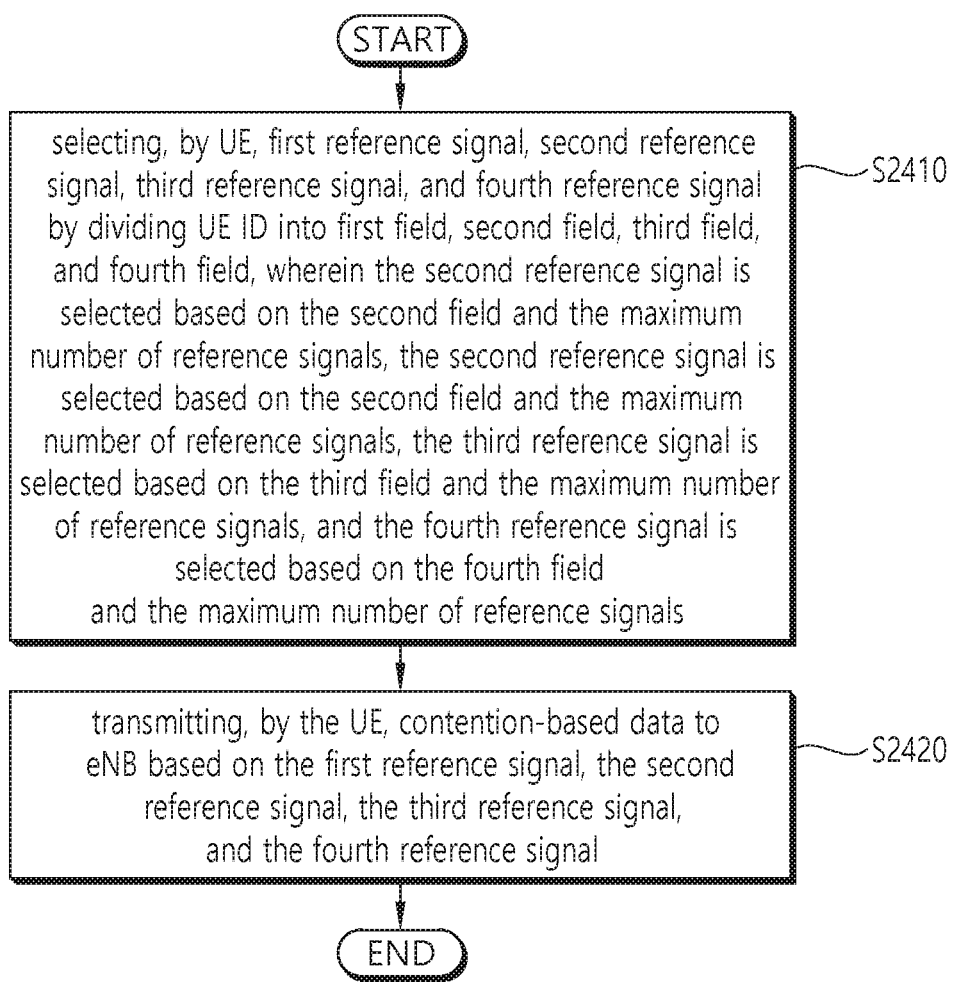
FIG. 24 is a flowchart showing a procedure of transmitting contention based data in a wireless communication system to which a non-orthogonal multiple access scheme is applied according to the present embodiment.

FIG. 24 is a flowchart showing a procedure of transmitting contention based data in a wireless communication system to which a non-orthogonal multiple access scheme is applied according to the present embodiment.

First, summarizing terminologies, a UE ID may correspond to C-RNTI information. A reference signal may correspond to a DMRS.

In contention based data transmission to which the legacy NoMA scheme is applied, a DMRS and a codeword are mapped for each index, and thus there is a problem in that collision occurs also in the codeword when collision occurs in the DMRS. In addition, since a UE selects the DMRS based on the C-RNTI, there is also a problem in that collision occurs repeatedly by using the same DMRS when values obtained through a module operation with the C-RNTI are identical. In contention based data transmission to which the NoMA scheme is applied, channels can be distinguished from each other by differently using the DMRS even if multiple UEs use the same time-frequency resource. In order to avoid the aforementioned problem, the present embodiment describes a DMRS selection scheme (or UE ID information configuration method) for avoiding data collision and for decreasing an information amount of a C-RNTI field.

In step S2410, the UE selects a first reference signal, a second reference signal, a third reference signal, and a fourth reference signal, by dividing the UE ID into a first field, a second field, a third field, and a fourth field. In the legacy LTE, although the UE ID consists of 16 bits and thus $2^{16}$ UE IDs exist, a physical resource may be insufficient to generate $2^{16}$ DMRSs. Accordingly, a DMRS may be selected by dividing the UE ID by 4 bits as in the above scheme.

The first reference signal is selected based on the first field and the maximum number of reference signals. The second reference signal is selected based on the second field and the maximum number of reference signals. The third reference signal is selected based on the third field and the maximum number of reference signals. The fourth reference signal is selected based on the fourth field and the maximum number of reference signals.

Specifically, the first reference signal may be selected through a modulo operation value of the first field and the maximum number of reference signals. The second reference signal may be selected through a modulo operation value of the second field and the maximum number of reference signals. The third reference signal may be selected through a modulo operation value of the third field and the maximum number of reference signals. The fourth reference signal may be selected through a modulo operation value of the fourth field and the maximum number of reference signals.

In this case, the first field, the second field, the third field, and the fourth field may be converted into decimal and subjected to a module operation with the maximum number of reference signals. If the maximum number of reference signals is not $2^n$, a reference signal may be selected through a modulo operation as described above by dividing the UE ID with respect to the maximum number of reference signals. For example, if the maximum number of reference signals is 12, the UE may select the first reference signal, the second reference signal, the third reference signal, the fourth reference signal, and the fifth reference signal by dividing the UE ID into the first field, the second field, the third field, the fourth field, and the fifth field. In this case, the first field, the second field, the third field, the fourth field, and the fifth field may be converted into 12 hexadecimal and subjected to a modulation operation with the maximum number of reference signals.

For example, the first field may include first 4 bits of the UE ID. The second field may include second 4 bits of the UE ID. The third field may include third 4 bits of the UE ID. The fourth field may include fourth 4 bits of the UE ID.

For another example, the first field may include first 4 bits of the UE ID. The second field may include first 8 bits of the UE ID. The third field may include first 12 bits of the UE ID. The fourth field may include all 16 bits of the UE ID.

In step S2420, the UE transmits the contention-based data to an eNB based on the first reference signal, the second reference signal, the third reference signal, and the fourth reference signal.

Until the contention based data does not collide with data of another UE, the contention based data may be transmitted by sequentially using the first reference signal, the second reference signal, the third reference signal, and the fourth reference signal.

Specifically, the UE may select the first reference signal and firstly transmit the contention based data. Even if collision occurs in the $1^{st}$ transmission, the UE may select the second reference signal and secondly transmit the contention based data. Even if collision occurs in the $2^{nd}$ transmission, the UE may select the third reference signal and thirdly transmit the contention based data. Even if collision occurs in the $3^{rd}$ transmission, the UE may select the fourth reference signal and fourthly transmit the contention based data. That is, a collision ratio is decreased through $1^{st}$, $2^{nd}$, $3^{rd}$, and $4^{th}$ transmissions, and UE-specific contention based data can be transmitted in the $4^{th}$ transmission.

In addition, the contention based data may be transmitted through the same time-frequency resource by using a codeword mapped to each of the first reference signal, the second reference signal, the third reference signal, and the fourth reference signal. An index may be mapped to each of the reference signal and the codeword. In addition, an index may also be mapped to each of a reference signal and codeword in a scrambling sequence.

In addition, the UE may transmit to the eNB the first reference signal, second reference signal, third reference signal, and fourth reference signal used when the contention based data is transmitted. The eNB may estimate and equalize a channel through which the contention based data is delivered by using a reference signal received from the UE.

Data collision with another UE can be avoided according to the above embodiment. Hereinafter, a method of decreasing an information amount of a UE ID will be described.

The first field may consist of a field indicating detection of the first to fourth reference signals. The second to fourth fields may consist of a field indicating UE ID information reduced due to detection of the first to fourth reference signals through the first field. That is, the UE ID may be derived by combining each index of the reference signal and reduced UE ID information in a data zone. Likewise, the UE may select the reference signal through a module operation of the maximum number of reference signals with each field of the UE ID.

Accordingly, through blind detection for a reference signal, an eNB may derive 4-bit information of the first field and derive 12-bit information through the second to fourth fields in a data zone to acquire a reconfigured UE ID corresponding to 16 bits in total. Accordingly, an information amount of the UE ID may be decreased by 4 bits to improve spectral efficiency.

In addition, the eNB may perform auto-correlation on each reference signal through blind detection, and upon discovering a reference signal exceeding a threshold, may perform channel equalization on a channel through the reference signal, thereby decreasing interference from another channel to the maximum extent possible. That is, there is a change in a method of configuring UE ID information in terms of the UE, and there is a change in a method of detecting UE ID information in terms of the eNB.

In addition, the contention based data may include the UE ID and a transmission field. The transmission field may indicate at which order the contention based data is transmitted to the eNB. The transmission field may consist of 2 bits.

Specifically, if the transmission field indicates that the contention based data is firstly transmitted to the eNB, the contention based data may be transmitted by using the first reference signal. If the transmission field indicates that the contention based data is secondly transmitted to the eNB, the contention based data may be transmitted by using the second reference signal. If the transmission field indicates that the contention based data is thirdly transmitted to the eNB, the contention based data may be transmitted by using the third reference signal. If the transmission field indicates that the contention based data is fourthly transmitted to the eNB, the contention based data may be transmitted by using the fourth reference signal.

Figure 25:
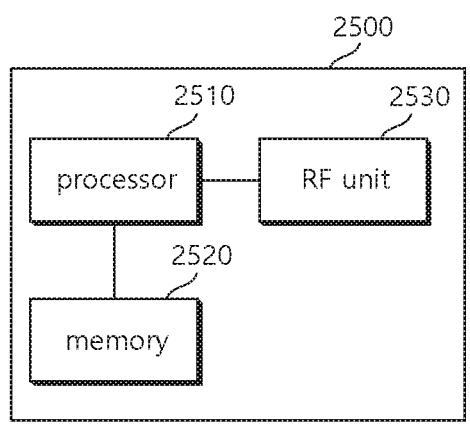
FIG. 25 is a block diagram showing an apparatus for wireless communication for implementing an embodiment of the present invention.

FIG. 25 is a block diagram showing an apparatus for wireless communication for implementing an embodiment of the present invention.

An apparatus 2500 for wireless communication includes a processor 2510, a memory 2520 and a radio frequency (RF) unit 2530.

The processor 2510 may be configured to implement proposed functions, procedures and/or methods described in this description. Layers of the radio interface protocol may be implemented in the processor 2510. The processor 2510 may handle a procedure explained above. The memory 2520 is operatively coupled with the processor 2510, and the RF unit 2530 is operatively coupled with the processor 2510.

The processor 2510 may include application-specific integrated circuit (ASIC), other chipset, logic circuit and/or data processing device. The memory 2520 may include read-only memory (ROM), random access memory (RAM), flash memory, memory card, storage medium and/or other storage device. The RF unit 2530 may include baseband circuitry to process radio frequency signals. When the embodiments are implemented in software, the techniques described herein can be implemented with modules (e.g., procedures, functions, and so on) that perform the functions described herein. The modules can be stored in memory 2520 and executed by processor 2510. The memory 2520 can be implemented within the processor 2510 or external to the processor 2510 in which case those can be communicatively coupled to the processor 2510 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of transmitting contention-based data in a wireless communication system to which a non-orthogonal multiple access scheme is applied, the method comprising:
    selecting, by a user equipment (UE), a first reference signal, a second reference signal, a third reference signal, and a fourth reference signal, by dividing a UE identifier (ID) into a first field, a second field, a third field, and a fourth field; and
    transmitting, by the UE, the contention-based data to a base station (BS) based on the first reference signal, the second reference signal, the third reference signal, and the fourth reference signal,
    wherein the first reference signal is selected based on the first field and the maximum number of reference signals,
    wherein the second reference signal is selected based on the second field and the maximum number of the reference signals,
    wherein the third reference signal is selected based on the third field and the maximum number of the reference signals,
    wherein the fourth reference signal is selected based on the fourth field and the maximum number of the reference signals, and
    wherein until the contention-based data does not collide with data of another UE, the contention-based data is transmitted by sequentially using the first reference signal, the second reference signal, the third reference signal, and the fourth reference signal.

2. The method of claim 1, wherein the contention based data is transmitted through the same time frequency resource by using codewords mapped to the first reference signal, the second reference signal, the third reference signal, or the fourth reference signal respectively.

3. The method of claim 1, further comprising transmitting, by the UE to the BS, the first reference signal, second reference signal, third reference signal, or fourth reference signal used when the contention based data is transmitted.

4. The method of claim 1,
    wherein the first reference signal is selected through a modulo operation value of the first field and the maximum number of the reference signals,
    wherein the second reference signal is selected through a modulo operation value of the second field and the maximum number of the reference signals,
    wherein the third reference signal is selected through a modulo operation value of the third field and the maximum number of the reference signals, and
    wherein the fourth reference signal is selected through a modulo operation value of the fourth field and the maximum number of the reference signals.

5. The method of claim 4,
    wherein the first field comprises first 4 bits of the UE ID,
    wherein the second field comprises second 4 bits of the UE ID,
    wherein the third field comprises third 4 bits of the UE ID, and
    wherein the fourth field comprises fourth 4 bits of the UE ID.

6. The method of claim 4,
wherein the first field comprises first 4 bits of the UE ID,
wherein the second field comprises first 8 bits of the UE ID,
wherein the third field comprises first 12 bits of the UE ID, and
wherein the fourth field comprises total 16 bits of the UE ID.

7. The method of claim 5,
wherein the first field consists of a field indicating detection of the first to fourth reference signals, and
wherein the second to fourth fields consist of a field indicating UE ID information reduced due to detection of the first to fourth reference signals through the first field.

8. The method of claim 7,
wherein the contention based data comprises the UE ID and a transmission field, and
wherein the transmission field indicates at which order the contention based data is transmitted to the BS.

9. The method of claim 8,
wherein the transmission field consists of 2 bits,
wherein based on the transmission field indicating that the contention based data is firstly transmitted to the BS, the contention based data is transmitted by using the first reference signal,
wherein based on the transmission field indicating that the contention based data is secondly transmitted to the BS, the contention based data is transmitted by using the second reference signal,
wherein based on the transmission field indicating that the contention based data is thirdly transmitted to the BS, the contention based data is transmitted by using the third reference signal, and
wherein based on the transmission field indicating that the contention based data is fourthly transmitted to the BS, the contention based data is transmitted by using the fourth reference signal.

10. A user equipment (UE) for transmitting contention-based data in a wireless communication system to which a non-orthogonal multiple access scheme is applied, the UE comprising:
a radio frequency (RF) unit for transmitting and receiving a radio signal; and
a processor operatively coupled to the RF unit, wherein the processor is configured to:
select a first reference signal, a second reference signal, a third reference signal, and a fourth reference signal, by dividing a UE identifier (ID) into a first field, a second field, a third field, and a fourth field; and
transmit the contention-based data to a base station (BS) based on the first reference signal, the second reference signal, the third reference signal, and the fourth reference signal,
wherein the first reference signal is selected based on the first field and the maximum number of reference signals,
wherein the second reference signal is selected based on the second field and the maximum number of the reference signals,
wherein the third reference signal is selected based on the third field and the maximum number of the reference signals,
wherein the fourth reference signal is selected based on the fourth field and the maximum number of the reference signals, and
wherein until the contention-based data does not collide with data of another UE, the contention-based data is transmitted by sequentially using the first reference signal, the second reference signal, the third reference signal, and the fourth reference signal.

11. The UE of claim 10, wherein the contention based data is transmitted through the same time frequency resource by using codewords mapped to the first reference signal, the second reference signal, the third reference signal, or the fourth reference signal respectively.

12. The UE of claim 10, wherein the processor is configured to transmit, to the B S, the first reference signal, second reference signal, third reference signal, or fourth reference signal used when the contention based data is transmitted.

13. The UE of claim 10,
wherein the first reference signal is selected through a modulo operation value of the first field and the maximum number of the reference signals,
wherein the second reference signal is selected through a modulo operation value of the second field and the maximum number of the reference signals,
wherein the third reference signal is selected through a modulo operation value of the third field and the maximum number of the reference signals, and
wherein the fourth reference signal is selected through a modulo operation value of the fourth field and the maximum number of the reference signals.

14. The UE of claim 13,
wherein the first field comprises first 4 bits of the UE ID,
wherein the second field comprises second 4 bits of the UE ID,
wherein the third field comprises third 4 bits of the UE ID, and
wherein the fourth field comprises fourth 4 bits of the UE ID.

15. The UE of claim 13,
wherein the first field comprises first 4 bits of the UE ID,
wherein the second field comprises first 8 bits of the UE ID,
wherein the third field comprises first 12 bits of the UE ID, and
wherein the fourth field comprises total 16 bits of the UE ID.

16. The UE of claim 14,
wherein the first field consists of a field indicating detection of the first to fourth reference signals, and
wherein the second to fourth fields consist of a field indicating UE ID information reduced due to detection of the first to fourth reference signals through the first field.

17. The UE of claim 16,
wherein the contention based data comprises the UE ID and a transmission field, and
wherein the transmission field indicates at which order the contention based data is transmitted to the BS.

18. The UE of claim 17,
wherein the transmission field consists of 2 bits,
wherein based on the transmission field indicating that the contention based data is firstly transmitted to the BS, the contention based data is transmitted by using the first reference signal,
wherein based on the transmission field indicating that the contention based data is secondly transmitted to the BS, the contention based data is transmitted by using the second reference signal, wherein based on the transmission field indicating that the contention based data is thirdly transmitted to the BS, the contention based data is transmitted by using the third reference signal, and wherein based on the transmission field indicating that the contention based data is fourthly transmitted to the BS, the contention based data is transmitted by using the fourth reference signal.

\* \* \* \* \*